(12) United States Patent
Hudson et al.

(10) Patent No.: US 12,186,783 B2
(45) Date of Patent: Jan. 7, 2025

(54) APPARATUS, SYSTEM AND METHOD FOR CLEANING A WHEELBARROW

(71) Applicant: CB INNOVATIONS PTY LIMITED, Sydney (AU)

(72) Inventors: Angus James Hudson, Vaucluse (AU); Karl Manning Vaupel, Paddington (AU); Samuel Rhys Davies, Hunters Hill (AU)

(73) Assignee: CB INNOVATIONS PTY LIMITED, Sydney (AU)

( * ) Notice: Subject to any disclaimer, the term of this patent is extended or adjusted under 35 U.S.C. 154(b) by 667 days.

(21) Appl. No.: 16/646,544

(22) PCT Filed: Sep. 11, 2018

(86) PCT No.: PCT/AU2018/050981
§ 371 (c)(1),
(2) Date: Mar. 11, 2020

(87) PCT Pub. No.: WO2019/051539
PCT Pub. Date: Mar. 21, 2019

(65) Prior Publication Data
US 2020/0276623 A1    Sep. 3, 2020

(30) Foreign Application Priority Data
Sep. 12, 2017    (AU) ................ 2017903698

(51) Int. Cl.
| *B08B 17/02* | (2006.01) |
| *A47K 1/04* | (2006.01) |
| *B08B 9/093* | (2006.01) |
| *B65F 1/00* | (2006.01) |
| *B62B 1/18* | (2006.01) |

(52) U.S. Cl.
CPC ............. *B08B 17/025* (2013.01); *A47K 1/04* (2013.01); *B08B 9/093* (2013.01); *B65F 1/0046* (2013.01); *B62B 1/18* (2013.01); *B65F 2210/132* (2013.01)

(58) Field of Classification Search
CPC ......... B08B 17/025; B08B 9/093; A47K 1/04; B65F 1/0046; B65F 1/18; B65F 2210/132
USPC ...................................... 134/104.2
See application file for complete search history.

(56) References Cited

U.S. PATENT DOCUMENTS

| 360,436 A | 4/1887 | Grinnell |
| 1,424,451 A | 8/1922 | Crandall |
| 3,819,070 A | 6/1974 | Clarke et al. |
| 4,350,584 A | 9/1982 | Donington |

(Continued)

FOREIGN PATENT DOCUMENTS

CA    2762535 A1 *  6/2013  ........... B08B 17/025

*Primary Examiner* — J. Gregory Pickett
*Assistant Examiner* — Niki M Eloshway
(74) *Attorney, Agent, or Firm* — BRYAN CAVE LEIGHTON PAISNER LLP

(57) ABSTRACT

In an aspect, there is disclosed an example of apparatus (10) for cleaning a wheelbarrow (12) with a fluid. The apparatus (10) includes a receptacle (16), a filter (18) fittable to the receptacle (16) in a fitted condition and a support arrangement (19) adapted to hold the wheelbarrow (12) in a tipped orientation relative to the receptacle (16) such that matter within a tray of the wheelbarrow is moveable at least partially via gravity into the receptible (16). Various examples of the apparatus, a system, a kit and associated methods of use are also disclosed.

20 Claims, 18 Drawing Sheets

(56) References Cited

U.S. PATENT DOCUMENTS

| | | | |
|---|---|---|---|
| 5,143,102 A * | 9/1992 | Blaul | B08B 3/006 |
| | | | 134/172 |
| 5,335,784 A | 8/1994 | Tyler | |
| 5,624,038 A | 4/1997 | Curtis | |
| 7,479,225 B1 * | 1/2009 | Venable | B07B 1/04 |
| | | | 210/474 |
| 2003/0011154 A1 * | 1/2003 | Scott | B62B 1/20 |
| | | | 280/47.31 |
| 2003/0047493 A1 | 3/2003 | Schulte et al. | |
| 2003/0084522 A1 | 5/2003 | Daniels et al. | |
| 2008/0023376 A1 | 1/2008 | Zeller | |
| 2010/0294730 A1 * | 11/2010 | Weston | B03B 9/063 |
| | | | 210/241 |
| 2011/0197980 A1 * | 8/2011 | Sullivan | B28C 5/4203 |
| | | | 137/544 |
| 2012/0067807 A1 * | 3/2012 | Lappeman | B01D 35/027 |
| | | | 210/301 |
| 2012/0111364 A1 * | 5/2012 | Pruyn | B28C 5/4203 |
| | | | 220/500 |
| 2012/0305455 A1 | 12/2012 | Westgard | |
| 2016/0150774 A1 * | 6/2016 | Suviri | E04D 13/076 |
| | | | 43/132.1 |
| 2016/0221221 A1 * | 8/2016 | Connard, III | B28C 5/4244 |
| 2018/0250848 A1 * | 9/2018 | Connard, III | B01F 35/1452 |

\* cited by examiner

APPARATUS, SYSTEM AND METHOD FOR CLEANING A WHEELBARROW

RELATED APPLICATIONS

This application is the National Stage of International Application No. PCT/AU2018/050981 filed 11 Sep. 2018, which claims priority to and the benefit of Australian provisional patent application no. 2017903698 filed on 12 Sep. 2017 with IP Australia, the contents of which are incorporated by reference.

TECHNICAL FIELD

The invention relates to an apparatus, a system and a method for cleaning tools and equipment such as a wheelbarrow.

BACKGROUND

Tools and equipment such as wheelbarrows are used on building sites for a variety of reasons. One use for a wheelbarrow involves the carriage of cement within a tray of the wheelbarrow. During use, the cement becomes caked on inside of the tray and must be cleaned from the tray.

To clean the tray, the wheelbarrow may be tipped by a user and rested on the ground or held by a further assisting user. The soiled water and cement are then washed onto the ground or into a drain. A similar process may occur for tools and equipment that may need to be cleaned, for example, trowels that may have caked cement thereon or paint brushes with excess paint.

A problem with cleaning such tools and equipment relates to handling of the waste product including solids and contaminated water. A problem specific to the cleaning the wheelbarrow tray relates to the awkward holding of the wheelbarrow or two persons being required. Another problem relates to the soiled water and handling of waster cement that may pollute the surrounding environment.

The invention disclosed herein seeks to overcome one or more of the above-identified problems or at least provide a useful alternative.

SUMMARY

In accordance with a first aspect there is provided an apparatus for cleaning a wheelbarrow with a fluid, the apparatus comprising a tub and a filter, the tub having a back wall opposite a front wall, opposing side walls, a base and a rim, the tub having a cut out in the front wall thereof, the cut out having opposing side sections, spaced from the side walls, extending from the tub rim to an intermediate section that is relatively lower than the tub rim, and spaced from the base, such that a leading portion of a wheelbarrow tray is movable thereover without elevating a wheel of the wheelbarrow, the cut out being shaped to receive at least a leading portion of a wheelbarrow tray when thereby providing a support arrangement, the filter being fittable in the tub and including a cut out in a front wall thereof corresponding to a cut out of the tub, a back wall opposite the front wall, opposing side walls, a base and a skirting flap adapted to engage the tub rim, and wherein the support arrangement is adapted to at least temporarily hold the wheelbarrow in a tipped orientation relative to the tub such that matter within a tray of the wheelbarrow is moveable at least partially via gravity into the tub.

In an aspect, a receptacle is provided by a tub having a cut out in a front wall thereof, the cut out being shaped to receive at least a leading portion of the tray in the tipped orientation.

In another aspect, the tub includes a back wall opposite the front wall, opposing side walls, a base and a skirting rim.

In yet another aspect, the support arrangement includes at least one tray support arranged to abut with the leading portion of the tray in the tipped orientation.

In yet another aspect, the support arrangement includes at least two tray supports adapted to hold opposing sides of the leading portion of the tray in the tipped orientation.

In yet another aspect, the support arrangement includes two tray supports that are each arranged to be movably coupled to the tub so as to be moveable between a first position in which two tray supports are elevated relative to the rim and a second position in which the two tray supports are moveable adjacent the rim with the filter fittable between the two tray supports and the rim.

In yet another aspect, the two tray supports are located proximate opposing sides of the cut out.

In yet another aspect, the two tray supports each include a body and a projection extending from the body adapted to engage with the leading portion of the tray.

In yet another aspect, the body is pivotally coupled to the tub proximate opposing sides of the cut out.

In yet another aspect, the projections of each of the two tray supports are oriented toward one another in a direction substantially across the cut out.

In yet another aspect, the two tray supports each include a plurality of projections adapted to engage with differing sizes of the tray.

In yet another aspect, the support arrangement further includes a tether arranged to secure the wheelbarrow in the tipped orientation.

In yet another aspect, the tether is an elastic strap adapted to releasably couple to the tub on opposing sides of the cut out.

In yet another aspect, the cut out is shaped to cradle the leading portion of the tray in the tipped orientation thereby providing the support arrangement.

In yet another aspect, the cut out is shaped to engage an underside of the leading portion of the tray in the tipped orientation thereby providing an underside support of the support arrangement.

In yet another aspect, the cut out includes opposing side sections extending from the rim to an intermediate section that is relatively lower than the rim.

In yet another aspect, the intermediate section is arranged such that the tray is movable thereover without elevating a wheel of the wheelbarrow relative to the tub.

In yet another aspect, the intermediate section is elevated relative to the base with at least some of the front wall extending between the intermediate section and the base.

In yet another aspect, the intermediate section includes an intermediate lip extending along a top thereof.

In yet another aspect, the intermediate lip is substantially horizontal and extends relatively outwardly from the front side of the tub.

In yet another aspect, the opposing side sections are shaped to cradle the tray of the wheelbarrow in the tipped orientation.

In yet another aspect, the opposing side sections are shaped such that the cut out narrows toward the intermediate section.

In yet another aspect, the opposing side sections are angled inwardly toward the intermediate section.

In yet another aspect, the side sections include a side lip against which the tray of the wheelbarrow bears in the tipped orientation.

In yet another aspect, the filter is shaped to substantially line an internal surface of the tub.

In yet another aspect, the filter includes a filter body shaped to correspond to an internal shape of the tub.

In yet another aspect, the filter includes a cut out in a front wall thereof corresponding to the cut out of the tub.

In yet another aspect, the filter includes a back wall opposite the front wall, opposing side walls, a base and a skirting flap extending substantially atop the back wall, opposing side walls and at least partially atop of the front wall.

In yet another aspect, the skirting flap of the filter is arranged to locate atop of the skirting rim of the tub in the fitted condition.

In yet another aspect, the filter includes an intermediate flap adapted to extend atop the cut out in the fitted condition.

In yet another aspect, the filter includes a handle.

In yet another aspect, the skirting flap of the filter includes a plurality of handles.

In yet another aspect, portions of skirting flap at the opposing sides walls, rear wall and intermediate flap each include a handle.

In yet another aspect, the filter includes a filter material adapted to filter solid material from the fluid.

In yet another aspect, the filter material is pre-shaped to fit the tub.

In yet another aspect, the filter material includes one or more of paper, cellulose, hemp, banana fibre, and recycled textiles.

In yet another aspect, the tub includes an outlet and an inside surface of the tub is shaped to promote flow of fluid through the filter toward the outlet.

In yet another aspect, at least some of an inside surface of the tub adjacent the filter is not smooth so as to promote flow of fluid through the filter.

In yet another aspect, at least some of an inside surface of the tub adjacent the filter includes one or more of corrugations, projections, ridges, apertures and recesses arranged to assist fluid through the filter.

In yet another aspect, the tub includes an outlet proximate the base.

In yet another aspect, the outlet is arranged to be fittable with a hose.

In yet another aspect, the outlet is arranged to be fittable with a treatment device.

In yet another aspect, the fluid treatment device is adapted to alter the pH of fluid passing therethrough.

In yet another aspect, the apparatus further included a removable tray adapted to seat atop of tub and filter.

In yet another aspect, the apparatus further includes a reservoir adapted to collect filtered fluid from the tub.

In yet another aspect, the reservoir includes a body on which the tub and wheelbarrow are locatable.

In yet another aspect, the body provides a platform on which the tub and wheelbarrow are locatable and a ramp to the platform.

In yet another aspect, the base of the tub is angled such that the tub is movable between an initial condition in which the wheelbarrow is supportable in the tipped orientation, and an angled condition in which the tub is self-supporting in angled draining condition.

In accordance with a further main aspect there is provided, a filter adapted for an apparatus as defined above and herein.

In accordance with a further main aspect there is provided, a fluid treatment device for an apparatus as defined above and herein.

In accordance with a further main aspect there is provided, a platform including a reservoir for an apparatus as defined above and herein.

In accordance with a further main aspect there is provided, a tub for an apparatus as defined above and herein.

In accordance with a further main aspect there is provided, a filter for a tub to filter solid material from a fluid washed from a wheelbarrow, the filter including a cut out in a front wall thereof corresponding to a cut out of the tub, a back wall opposite the front wall, opposing side walls, a base and a skirting flap extending substantially atop the back wall, opposing side walls and at least partially atop of the front wall and the cut out.

In aspect, the filter is pre-shaped to fit with the tub.

In another aspect, the skirting flap includes one or more handles.

In yet another aspect, the skirting flap includes handles adjacent the cut out, back wall and each of the opposing side walls.

In yet another aspect, the filter includes a filter material adapted to filter solid material from the fluid.

In yet another aspect, the filter material is flexible.

In yet another aspect, the filter material includes one or more of paper, cellulose, hemp, banana fibre, and recycled textiles.

In accordance with a further main aspect there is provided, an apparatus for cleaning tools or equipment using a fluid, the apparatus including a tub, a filter fittable to the receptacle in a fitted condition and a support arrangement adapted to hold the cleaning tools or equipment relative to the receptacle such that the fluid and any dislodged solids are collectable in the filter of the receptacle.

In an aspect, the apparatus includes a tub that includes a receptacle and wherein the filter is shaped to substantially fittingly cover internal surfaces of the tub.

In another aspect, the tub includes an outlet and the inside surface of the tub is shaped to promote flow of fluid through the filter toward the outlet.

In yet another aspect, at least some of an inside surface of the tub adjacent the filter is not smooth or flat so as to promote flow of fluid through the filter.

In yet another aspect, at least some of an inside surface of the tub adjacent the filter includes one or more of corrugations, projections, ridges, apertures and recesses arranged to assist fluid through the filter.

In yet another aspect, the tub includes an outlet proximate the base.

In accordance with a further main aspect there is provided, a system or kit for cleaning a wheelbarrow with a fluid, the system including a tub having a receptacle, a pre-shaped filter fittable to the receptacle in a fitted condition and a support arrangement adapted to hold the wheelbarrow in a tipped orientation relative to the receptacle such that matter within a tray of the wheelbarrow is moveable at least partially via gravity into the receptacle.

In accordance with an further main aspect there is provided, a method for cleaning a wheelbarrow with a fluid, the method including one or more of: locating a tub on a ground surface; fitting a filter to a receptacle of the tub; moving a wheelbarrow toward the tub in an initial orientation with at least a leading portion of the wheelbarrow received by a cut out of the tub and over the receptacle; lifting the wheelbarrow to a tipped orientation relative to the receptacle such that matter within a tray of the wheelbarrow is moveable at least partially via gravity into the receptacle; holding the wheelbarrow in the tipped orientation with a support arrangement; applying a cleaning fluid to the tray of the wheelbarrow; and capturing solid material within the filter; and disposing of the filter and captured solid material.

In accordance with a further main aspect there is provided, a stand for cleaning a wheelbarrow, the stand being adapted to support the wheelbarrow with the tray thereof in a tipped orientation relative to a supporting surface such that material or fluid within the tray is moveable at least partially via gravity in a direction from the tray toward the supporting surface.

In accordance with a further main aspect there is provided, a system for cleaning a wheelbarrow, the system including: a receptacle; a stand adapted to support the wheelbarrow in a tipped orientation relative to a receptacle such that material or fluid within a tray of the wheelbarrow is moveable at least partially via gravity toward the receptacle; and a filter locatable between the tray and the receptacle.

In accordance with a further main aspect there is provided, a method of cleaning a wheelbarrow, the method including: supporting a wheelbarrow in a tipped orientation with a tray thereof located at least partially above a receptacle; locating a filter substantially such that a fluid material mixture is passed from the tray through the filter into the receptacle; and applying a cleaning fluid to the tray of the wheelbarrow such that the fluid material mixture within the tray is moveable at least partially via gravity toward the receptacle with at least some solid material carried by the fluid material mixture being capturable by the filter.

BRIEF DESCRIPTION OF THE FIGURES

The invention is described, by way of non-limiting example only, by reference to the accompanying figures, in which.

DETAILED DESCRIPTION

First Example

Figure 1:
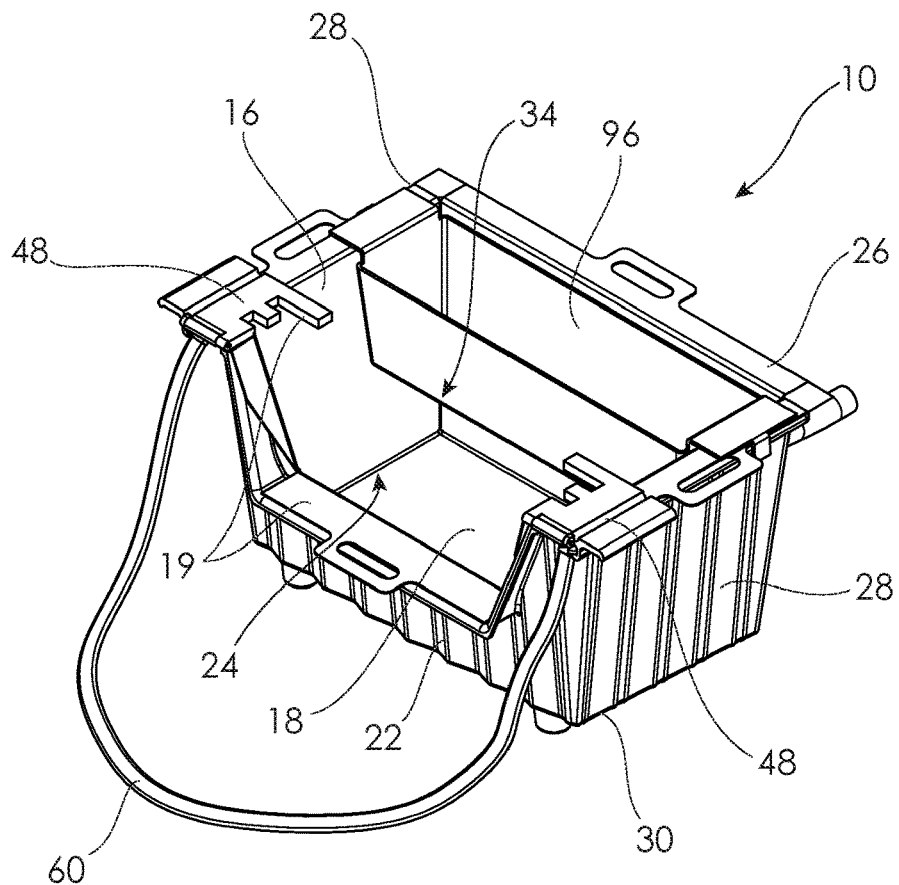
FIG. 1 is a perspective front view illustrating a first example of an apparatus for cleaning the wheelbarrow.
Figure 2:
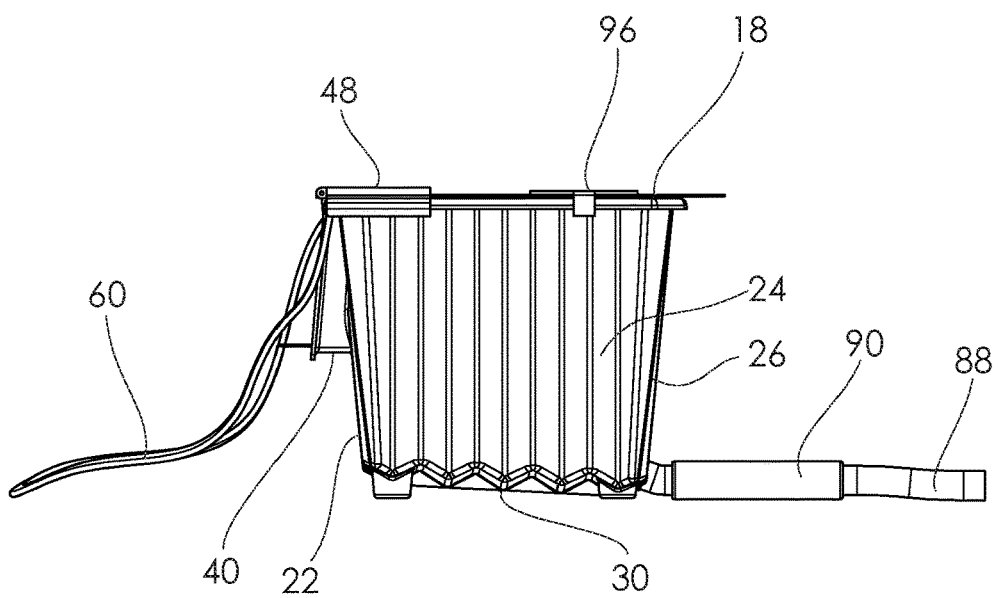
FIG. 2 is a side view illustrating the first example of the apparatus.
Figure 3:
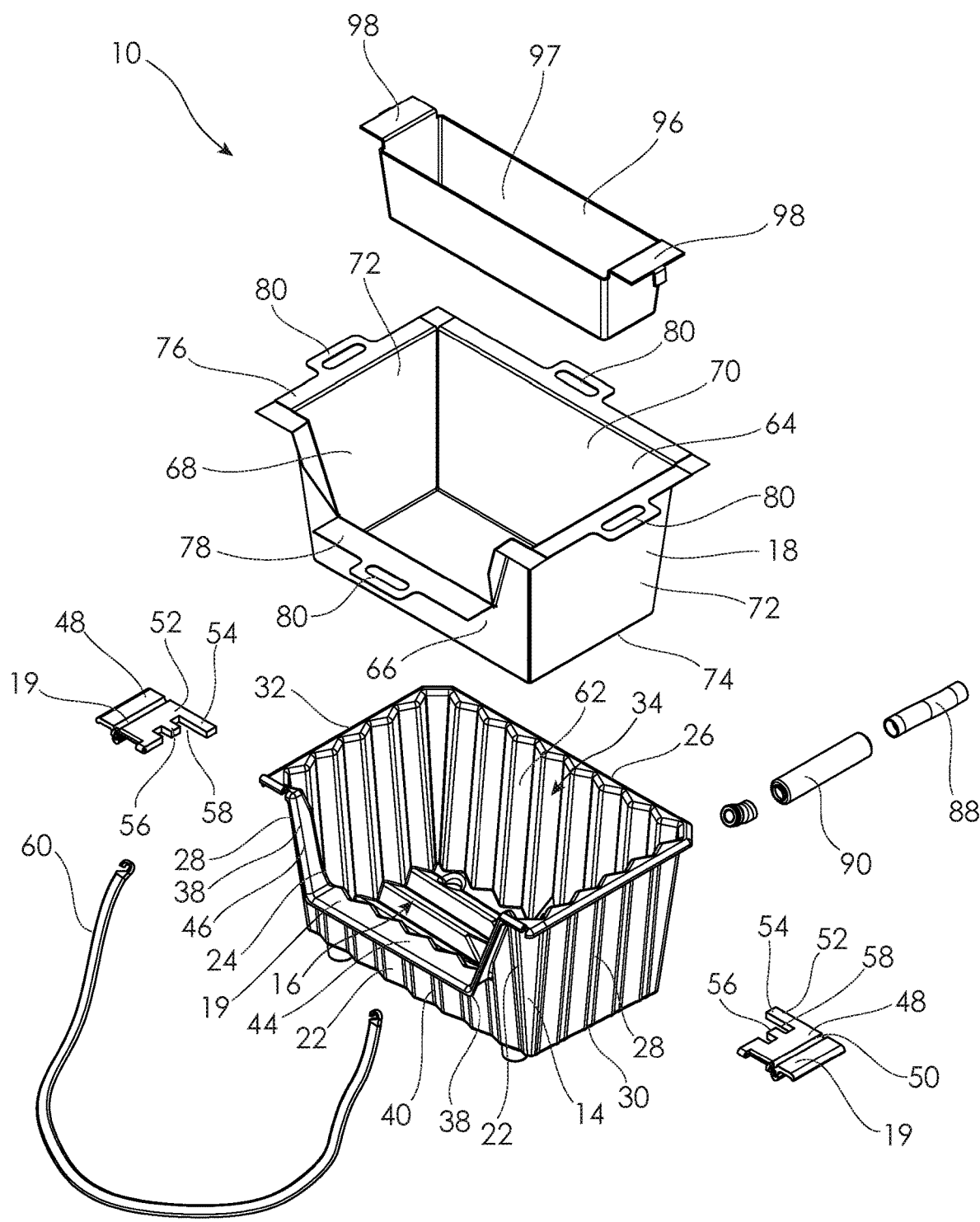
FIG. 3 is an exploded parts view illustrating the first example of the apparatus.
Figure 4:
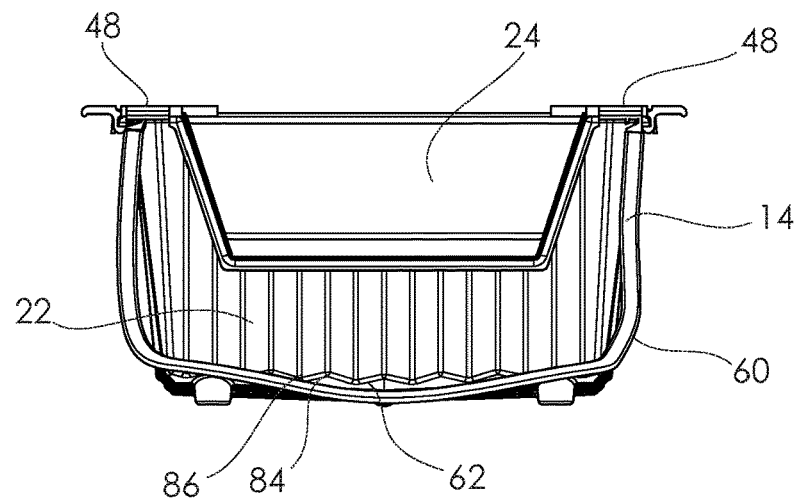
FIG. 4 is a front view illustrating the first example of the apparatus.
Figure 5:
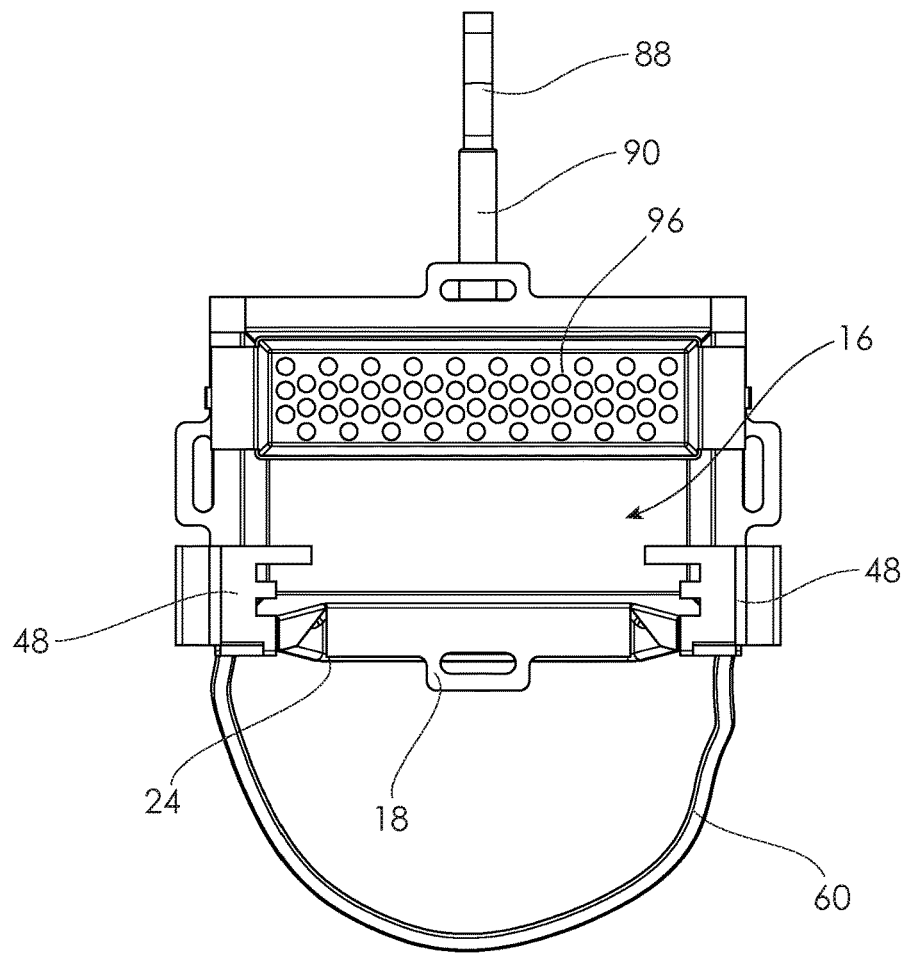
FIG. 5 is a top view illustrating the first example of the apparatus.
Figure 6:
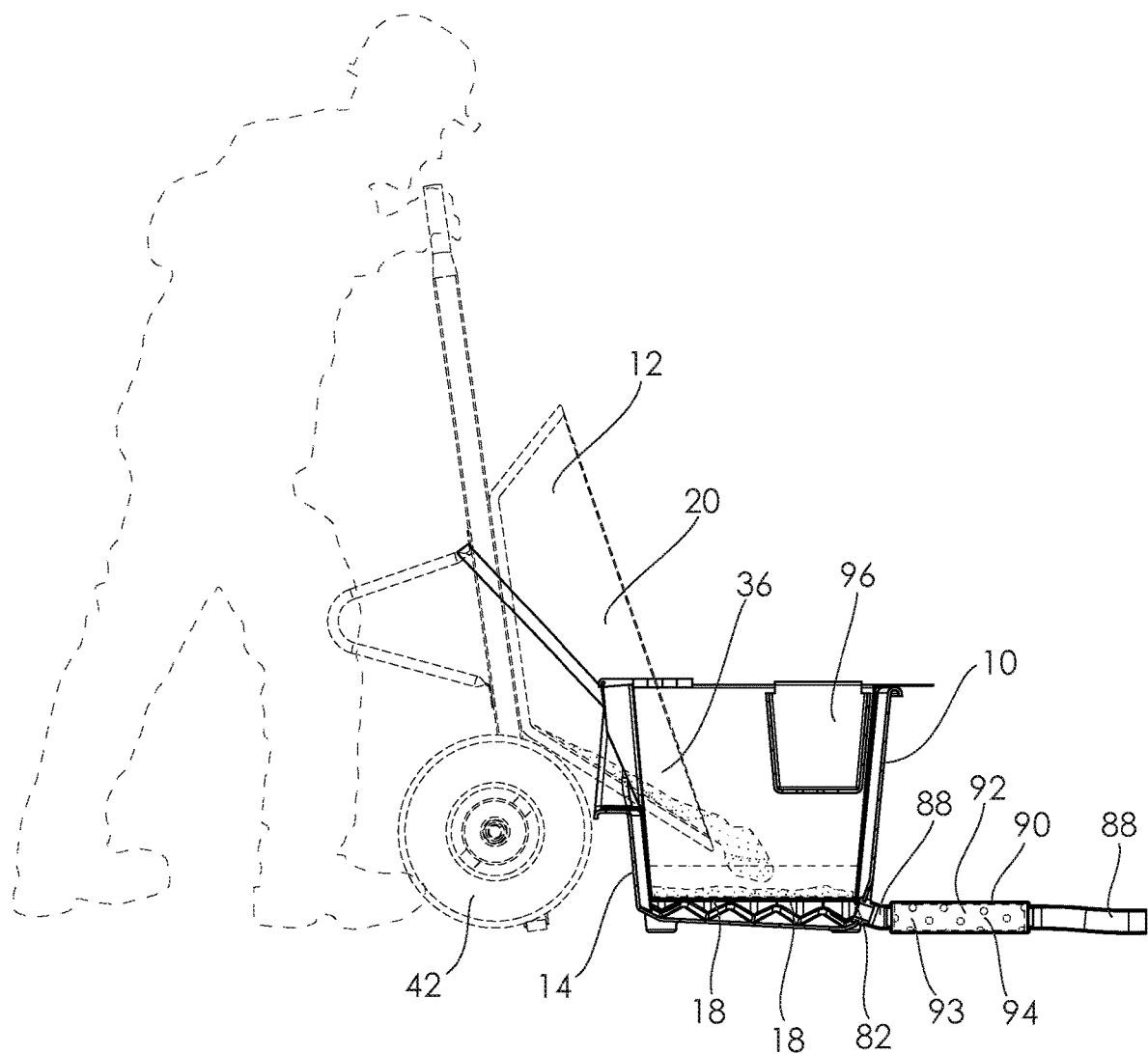
FIG. 6 is a side hidden detail in use view illustrating the first example of the apparatus, and a wheelbarrow in a tipped orientation.
Figure 7:
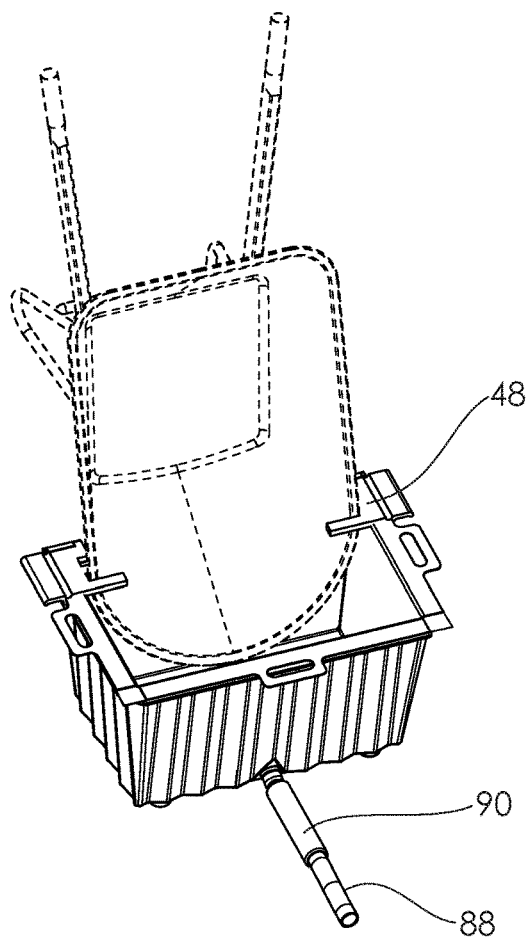
FIG. 7 is a rear perspective view illustrating the first example of the apparatus and the wheelbarrow in the tipped orientation, with tray supports of a support arrangement thereof in a second position engaged with the wheelbarrow.

Referring to FIGS. 1 to 11, there is disclosed a first example of an apparatus 10 for cleaning tools and equipment such as a wheelbarrow 12 as shown, for example, in FIG. 6. Such tools and equipment may be cleaned by using a cleaning fluid such as water to remove matter such as solid material, slurries and debris.

The apparatus 10 includes a tub 14 that provides a receptacle 16, a filter 18 shaped to be fitted to the receptacle 16 in a fitted condition and a support arrangement 19 adapted to at least temporarily hold the wheelbarrow 12 in a tipped orientation relative to the receptacle 16.

In the tipped orientation, matter within a tray 20 of the wheelbarrow 12 is moveable at least partially via gravity into the receptacle 16. For example, the cleaning fluid such as water may be applied to the tray 20 to wash matter into the receptacle 16 with solid material being at least partially captured by the filter 18 and the water passing through the filter 18.

The tub 14 includes a front wall 22 with a cut out 24, a back wall 26 opposite the front wall 22, opposing side walls 28, a base 30 and a skirting rim 32 extending substantially atop the back wall 26, opposing side walls 28 and at least partially about atop of the front wall 22. The skirting rim 32 may be the same width as or wider than the respective walls, 22, 26, 28.

The walls 22, 26, 28 of the tub 14 define an opening 34 into the receptacle 16 and taper slightly toward the base 30 such that the platform area of the base 30 is less than the opening 34.

The cut out 24 is shaped to receive at least a leading portion 36 of the tray 20 in the tipped orientation and may cradle and support the tray 20 depending on the fit between the cut out 24 and the tray 20. In some examples, the cut out 24 may provide the support arrangement 19 by supporting and holding the wheelbarrow 12 in the tipped orientation. However, in other examples, the cut out 24 may simply provide access to the receptacle and may not engage directly with the tray 20. In this example, the cut out 24 forms part of the support arrangement 19 in combination with tray supports 48 as are further detailed below.

The cut out 24 includes opposing side sections 38 extending from the skirting rim 32 to an intermediate section 40 that is relatively lower than the rim 32 and relatively above the base 30. The height of the intermediate section 40 is arranged such that the tray 20 is movable thereover without elevating a wheel 42 of the wheelbarrow 12 relative to the receptacle 16 which allows the wheel 42 to generally remain in contact with a ground surface without elevation or lifting of the entire wheelbarrow 12

The intermediate section 40 includes an intermediate lip 44 extending along a top thereof. The intermediate lip 44 is substantially horizontal and extends relatively outwardly from the front wall 22 of the tub 14. The opposing side sections 38 are shaped to cradle the tray 20 of the wheelbarrow 12 in the tipped orientation and may be curved or angled such that that the cut out narrows 24 toward the intermediate section 40. The side sections 38 include respective side lips 46 against which the tray 20 of the wheelbarrow 12 bears in the tipped orientation.

In this example, the support arrangement 19 includes a pair of tray supports 48 arranged to abut with the leading portion 36 of the tray 20 in the tipped orientation. The pair of tray supports 48 may take various forms that function to provide a stop to inhibit over tipping of the wheelbarrow 12 and at the same time provide a retainer that fittingly holds a rim of the tray 20.

In more detail, in this example, the tray supports 48 include a body 50 pivotally coupled to the front wall 22 adjacent the cut out 24 and projections 52 that extend from the body 50 adapted to engage with the leading portion 36 of the tray 20.

Figure 8:
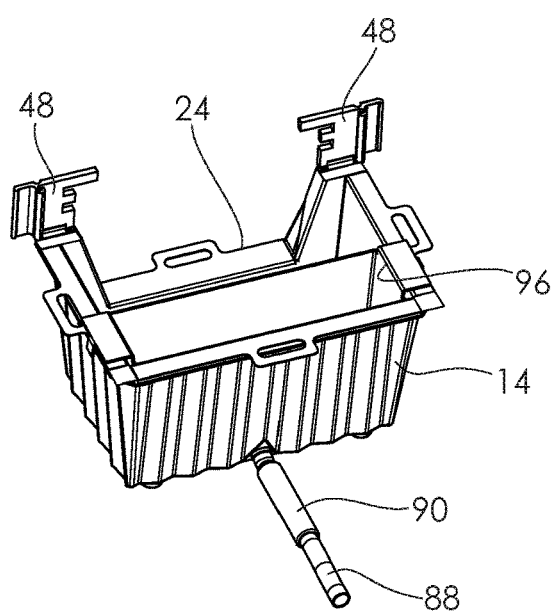
FIG. 8 is a rear perspective view illustrating the first example of the apparatus with the tray supports of the support arrangement thereof in a first position prior to engaging with the wheelbarrow.
Figure 9:
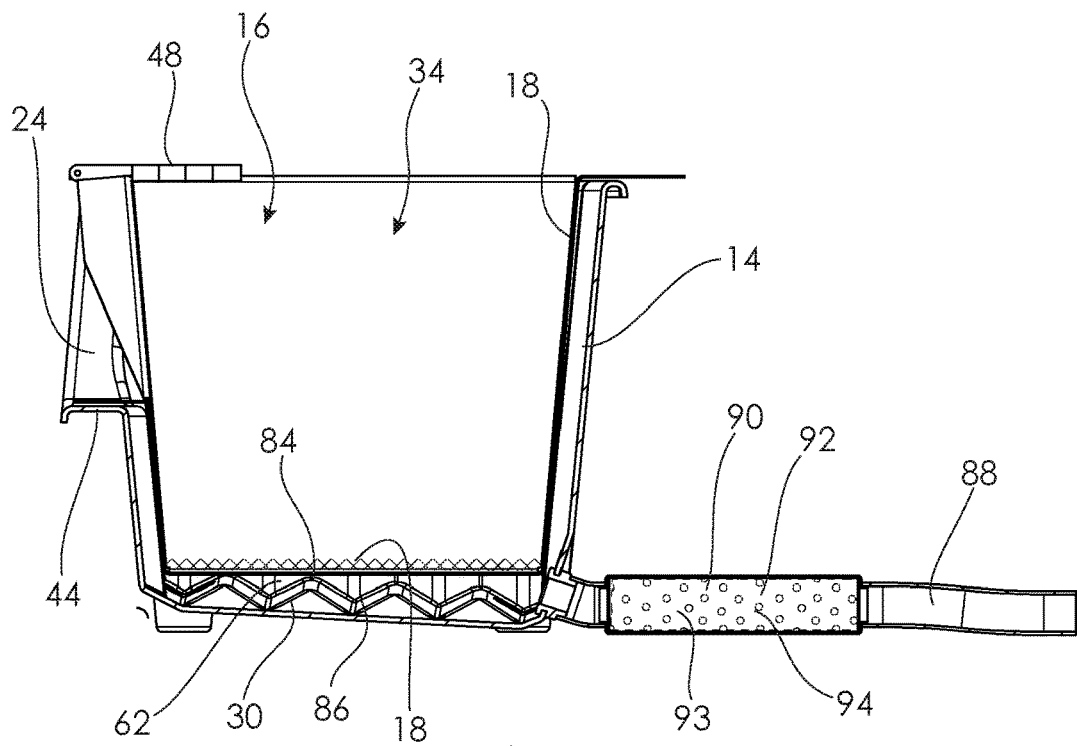
FIG. 9 is a side sectional view illustrating the first example of the apparatus.
Figure 10:
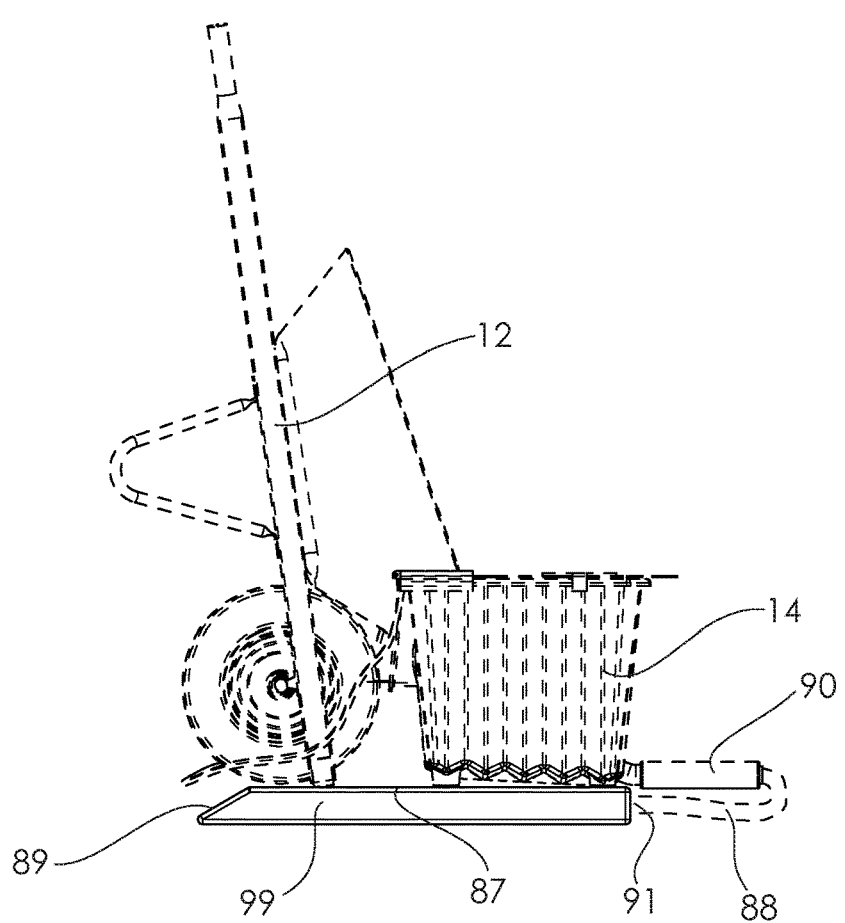
FIG. 10 is a side view illustrating the first example of the apparatus and the wheelbarrow in a tipped orientation located on a platform having a reservoir therein.
Figure 11:
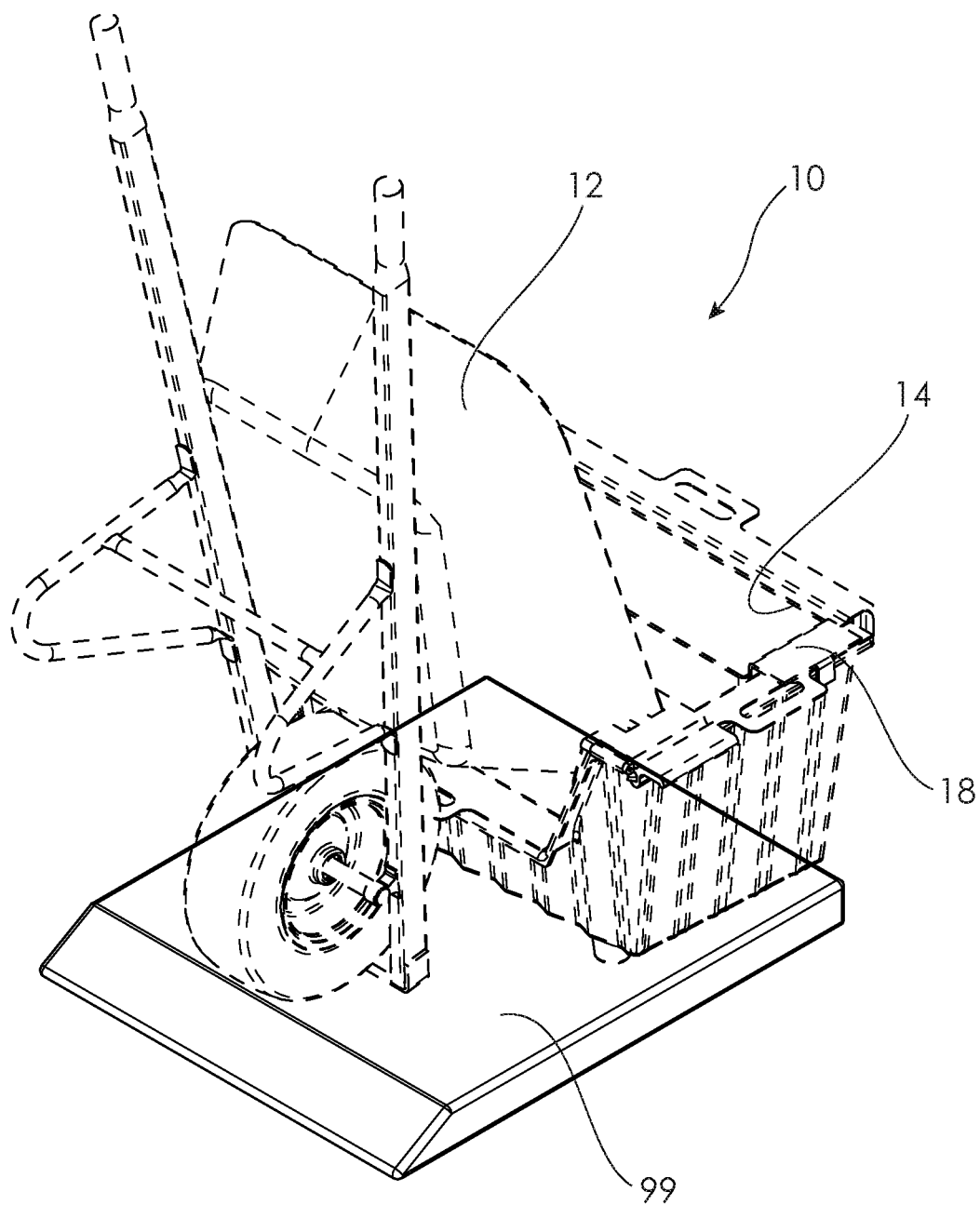
FIG. 11 is a perspective front view illustrating the first example of the apparatus and the wheelbarrow in the tipped orientation located on the platform.

In this arrangement, the tray supports 48 are moveable from a first position, as shown in FIG. 8, in which the tray supports 48 are rotated away from the rim 32 to allow the filter 18 to be fitted. Once the filter 18 is fitted, the tray supports 48 may be rotated adjacent the rim 32 atop of the filter 18. Accordingly, the tray supports 48 also function to capture and secure the filter 18 in place.

In this example, the projections 52 include a rear most larger projections 54 that defining a narrower gap therebetween and forward most smaller projections 56 that define a relatively larger gap therebetween. This allows the projections 52 to abut with trays 20 having differing sizes. The notches 58 between the projections 52 also assist to capture a rim of the tray 20 to retain the wheelbarrow in the tipped orientation. It is noted that in some examples the tray supports 48 may be omitted, and especially in examples in which the cut out 24 is adapted to snuggly hold the tray 20. Further, in other examples, the tray supports 48 may be formed integrally with the tub 14, as is shown in respect of the second example below.

The support arrangement 19 may further a tether 60 arranged to secure the wheelbarrow 12 in the tipped orientation. In this example, the tether 60 is an elastic strap 62 having hooks 64 at opposing ends thereof adapted to releasably couple to the tub 14 on opposing sides of the cut out 24. The strap 62 may be passed about the wheelbarrow 12 to secure the wheelbarrow 12 for cleaning, in particular, more vigorous cleaning and scrubbing.

Turning now to the filter 18 in more detail, the filter 18 may be pre-shaped to substantially line an internal surface 62 of the receptacle 16. The filter 18 includes a filter body 64 shaped to correspond to an internal shape of the tub 14. The filter body 64 includes a front wall 66 having a cut out 68, a back wall 70, opposing side walls 72 and a base 74. The cut out 68 corresponds to the cut out 24 of the tub 14.

A skirting flap 76 extends substantially atop the back wall 70, opposing side walls 72 and at least partially atop of the front wall 66. The skirting flap 76 of the filter 18 is arranged to locate atop of the skirting rim 32 of the tub 14 in the fitted condition. The filter 18 includes an intermediate flap 78 adapted to extend atop the cut out 24 in the fitted condition. In this example, handles skirting flap 76 at the opposing sides walls, rear wall and intermediate flap each include a handle 80. The handles 80 generally extend proud of the tub 14 to allow for ease of clasping and removal of the filter 18.

In terms of material, the filter 18 may be formed of various materials including, but not limited to, one or more of paper, cellulose, hemp, banana fibre, nylon, polyester, synthetic textiles and recycled textiles. The filter material is adapted to filter solid material from the fluid. For example, the filtered solid material may be cement and parts thereof such as sand and gravel. Fluid substantially including water passing through the filter 18 and toward the base 30 of the receptacle 16.

In this example, the filter material may be a filter paper with a single layer cellulose with a weight of about 180 GSM and pore retention size of 5-10 µm. The filter paper may be wet strengthened with an Epichlorohydrin Resin. The cleaning fluid may take about 20 minutes to drain through the filter. The filtration process may be assisted by a phenomenon known as a 'filter cake' which is when the captured solids/sediments sitting in the lowest point of filter act as a secondary filter.

The tub 14 includes an outlet 82 through which the receptacle 16 drains and the inside surface 62 of the receptacle 16 of the tub 14 is adapted to promote flow of fluid through the filter 18 toward the outlet 82. The inside surface 62 of the receptacle 16 generally slopes toward the centre and rear of the tub 14 and the outlet 82 is provided at the centre and rear of the tub 14.

At least some of the inside surface 62 adjacent the filter 18 adapted to promote flow of fluid through the filter 18 such as by being not smooth or not flat against the filter 18. In more detail, in this example, the inside surface 62 adjacent the filter 18 includes surface features in the form of ridges 84 and troughs 86 that support the filter 18 whilst providing, in essence, spaces or conduits via the troughs 86 to allow fluid to pass the filter 18 and flow toward the outlet 82.

It is noted that whilst in this example, ridges 84 and troughs 86 are provided, the internal surface 62 may be provided with various surface features that provide a similar function such as, but not limited to, one or more of corrugations, projections, ridges, apertures and recesses. The surface features may also be provided by separate part or insert e.g. wire mesh basket that fits below the filter 18—all of which are contemplated herein.

Turning to the outlet 82 in more detail, the outlet 82 is arranged to be fittable with a hose 88 and/or a fluid treatment device 90. In this example, the fluid treatment device 90 is adapted to alter the pH of fluid passing therethrough. The fluid treatment device 90 includes a housing 92 and ion-exchange media 93 retained within a stainless steel mesh bag 94 within the housing 92. It is noted that the fluid treatment device 90 may be omitted from some examples. The ion-exchange media 93 may be or include cation exchange resins such as, but not limited to, strongly acidic cation exchange resin.

It is noted that in some examples, the apparatus 10 may omit the filter 18 per se and include the fluid treatment device 90 perhaps with a pre or post filter between the outlet 82 and the fluid treatment device 90 or hose 88. Such a configuration is contemplated herein.

The apparatus 10 may further include a removable tray or tub 96 adapted to seat atop of tub 14 and filter 18. In this example, the removable tray 96 includes a receptacle 97 with drainage apertures and wings 98 that seat atop of the rim 32. The removable tray or tub 96 may be used to clean smaller tools and equipment. It is noted that in some examples, the cut out 24 may be omitted and the tub 14 and filter 18 may be used to clean tools and equipment other that wheel barrows.

In some examples, the apparatus 10 may further include a reservoir 99 adapted to collect filtered fluid from the tub 14. The reservoir 99 is provided within a body 85 that provides a platform 87 on which the tub 14 and wheelbarrow are locatable. The body 85 includes a ramp 89 to the platform 87. The reservoir 99 includes an inlet 91 that is connectable to the hose 88 and/or a fluid treatment device 90. The reservoir 99 may find use in situations where temporary waste storage is required.

The tub 14 and other components may be generally formed of, but not limited to, a plastic material such as polyethylene, nylon and polypropylene. The components of the apparatus may be considered to form part of a system or kit that function together. As such, the components of the apparatus such as the tub, filter, platform reservoir and fluid treatment device may be provided separately.

In use, a method for cleaning the wheelbarrow 12 with a fluid, may include one or more of the following steps. Firstly, locating the tub 14 on a ground surface or on the platform 87 of the reservoir 99. The tray supports 48 may be elevated and the filter 18 is fitted to the receptacle 16 of the tub 14. The tray supports 48 may then be lowered to secure the filter 18.

The wheel barrow 12 is then moved toward the tub 14 in an initial orientation with at least the leading portion 36 of the wheelbarrow 12 received by the cut out 24 of the tub 14 and over the receptacle 16. The wheelbarrow 12 is then moved to a tipped orientation relative to the receptacle 16 such that matter within the tray 20 of the wheelbarrow 12 is moveable at least partially via gravity into the receptacle 16. The tray is abutted with the tray supports 48 that form part of the support arrangement 19 to hold the wheelbarrow 12 in the tipped orientation. The wheelbarrow 12 may be optionally retained in the tipped orientation with the tether 60.

A cleaning fluid such as water is then applied to the tray 20 of the wheel barrow 12, and matter or mixture including solids and water is washed into the receptacle 16. The wheelbarrow 12 may be removed at this point or remain in place to dry.

The solid material is then substantially captured within the filter 18 and fluid passes via the outlet 82 into the hose 88 and/or fluid treatment device 90. The fluid is then treated to adjust to the pH to that closer to water, say, toward a pH of about 7. Once the fluid has passed the filter 18, the wheelbarrow 12 is removed (if not done so already) and the tray supports 48 may be elevated to release the filter 18. The filter 18 may then be removed via the handles 80 and the filter and solid material may be disposed of. It is noted that multiple wheelbarrows, equipment and tools may be washed using a single filter 18. However, once soiled to a point of inhibiting filtration, such as becoming clogged with cement, the filter may be replaced.

Advantageously, the apparatus allows a wheelbarrow and tools to be cleaned whilst capturing the wastewater and any solid material such as cement. The filter is able to be removed to safely dispose of captured material and the remaining water is able to be collected for disposal or treatment.

The support arrangement allows the wheelbarrow to be held for hands free cleaning and the integrated cut out allows the wheelbarrow to be tipped without lifting the entire wheel barrow. Tools may be supported by the cleaning tray above the tub that allows simultaneous cleaning of the wheelbarrow and tools whilst keeping waste water contained.

Second Example

Referring now to FIGS. 12 to 15 there is provided a second example of the apparatus 110 in which like sequences of numerals denote like parts (i.e. 10, 110 etc). Many components of this second example of the apparatus 110 are similar to the above described first example and are not again repeated here. Rather, the main features and differences are highlighted.

Turning to the second example of the apparatus 110 in more detail, the second example of the apparatus 110 is substantially similar to the first example. However, the tub 114 is provided in two parts including a lower tub section 115 and an upper tub section 117 that fit together in an assembled condition.

The upper tub section 117 includes a support arrangement 119 having a cut out 124 in a front wall 122 thereof that is shaped to support and cradle the tray 20 of the wheel barrow 12 and tray supports 148 are integrally formed at opposing side walls 128 of the upper tub section 117. The tray supports 48 include projections 152 that are oriented toward one another to define a gap narrower than a width of the tray 20 so as to provide a stop for the tray in the tipped orientation.

Like the first example, the projections 152 include a rear most larger projections 154 that define a narrower gap therebetween and forward most smaller projections 156 that define a relatively larger gap therebetween. This allows the projections 152 to abut with trays 20 having differing sizes. The apparatus 110 may also include a tether 60 to retain the wheel barrow in the tripped orientation against the tray supports 48.

The lower tub section 115 includes a base 130, opposing sides walls 129, opposing front and back walls 131 and a skirting rim 132. The lower tub section 115 provides a generally rectangularly shaped receptacle 116 defining an opening 134 in which the filter 118 is fittingly received. Like the first example, the internal surface 162 of the receptacle 116 is not flat or smooth and include ridges 184 and troughs 186 to assist with movement of fluid through the filter 118.

However, of course, other surface features such as apertures, undulations or the like may also be utilised. An outlet 182 is located at the back wall adjacent the base 130 to which a hose 188 and/or a fluid treatment device 190 may be fitted. The fluid treatment device 190 has already been described in relation to the first example and will not be again described here.

In this example, the filter 118 is rectangularly shaped to fit with the lower tub section 115 and includes a front wall 168, a back wall 170, opposing side walls 172 and a base 174. A skirting flap 176 extends about the walls 168, 170, 172. The skirting flap 176 is dimensioned to extend over the skirting rim 132 of the lower tub section 115.

Figure 12:
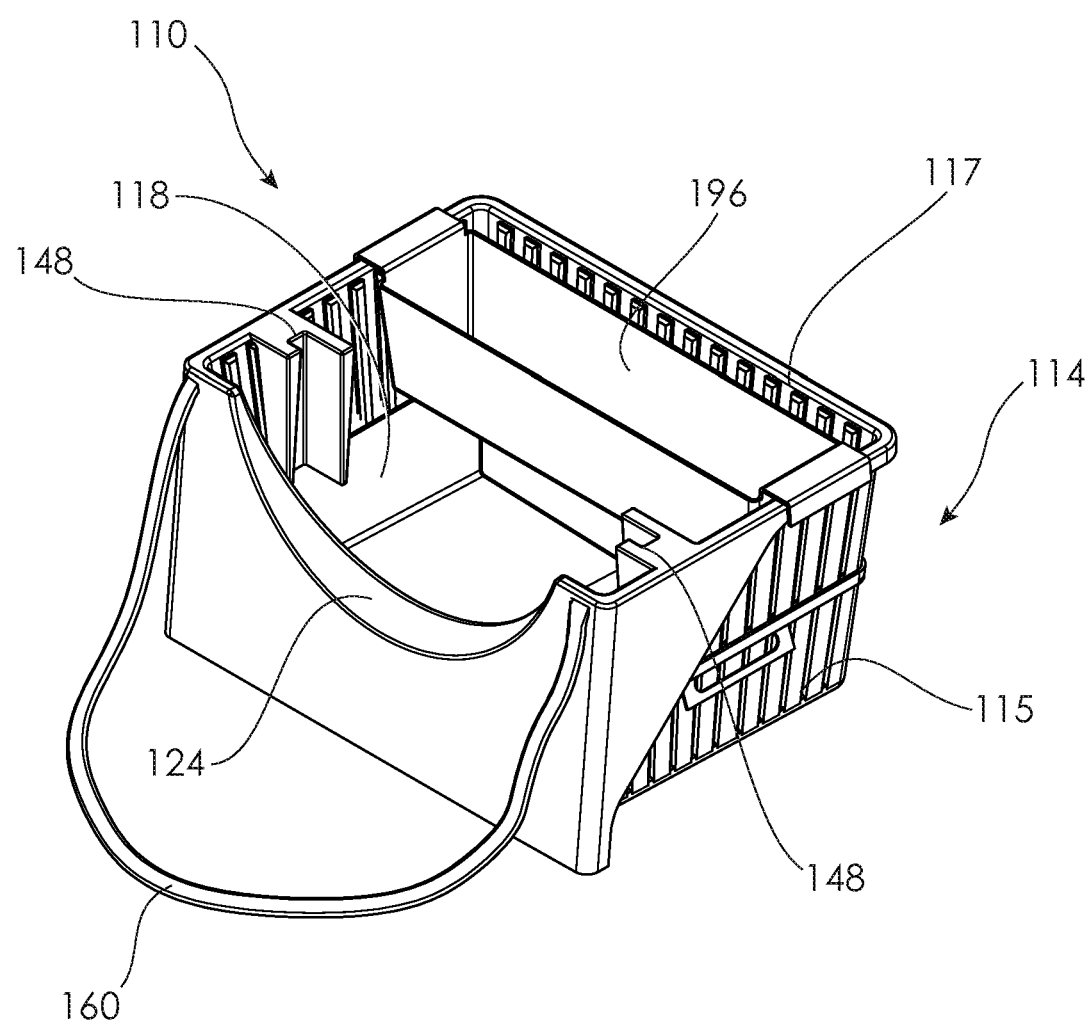
FIG. 12 is a perspective front view illustrating a second example of an apparatus for cleaning the wheelbarrow.
Figure 13:
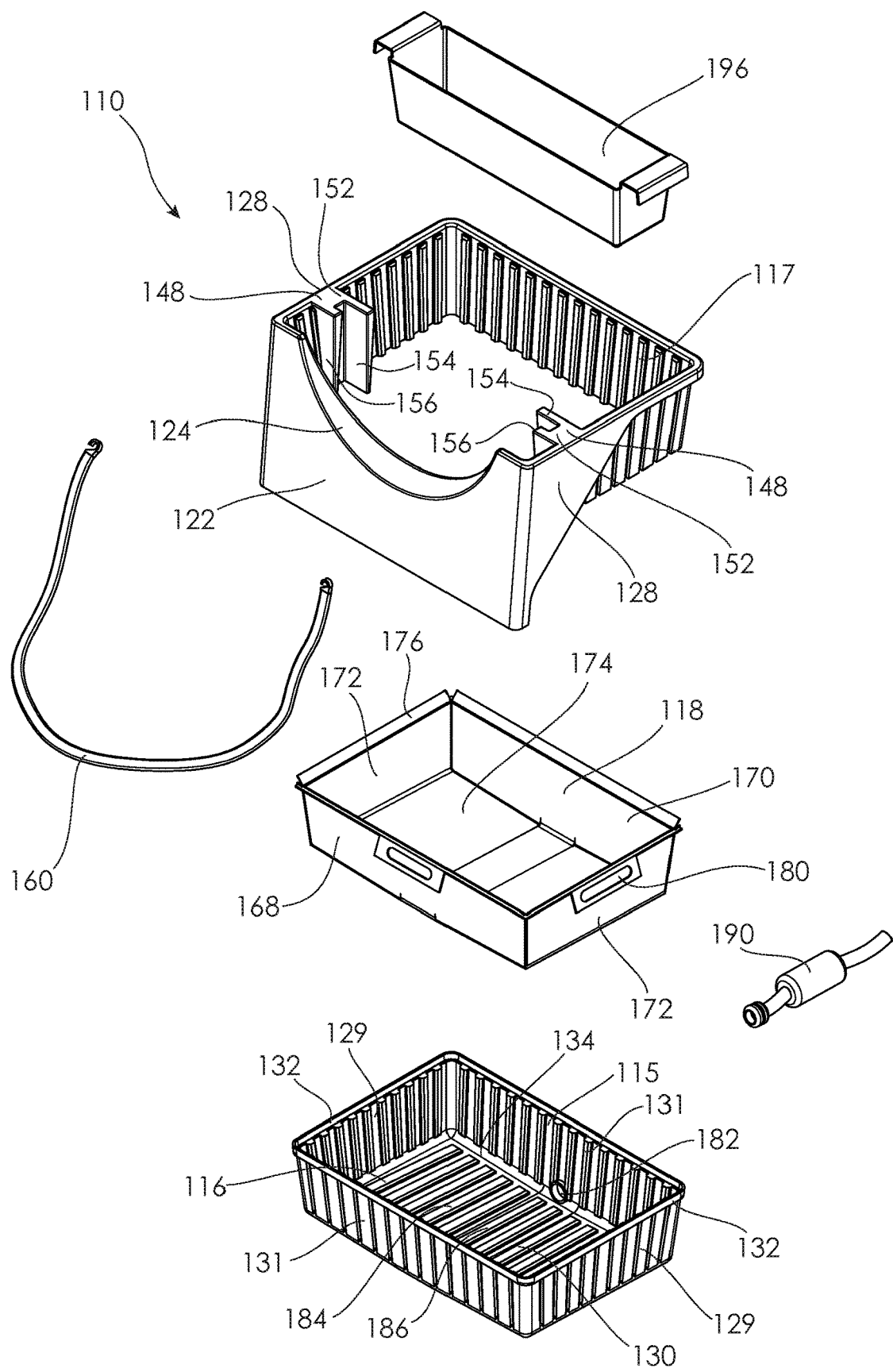
FIG. 13 is an exploded parts view illustrating the second example of the apparatus.
Figure 14:
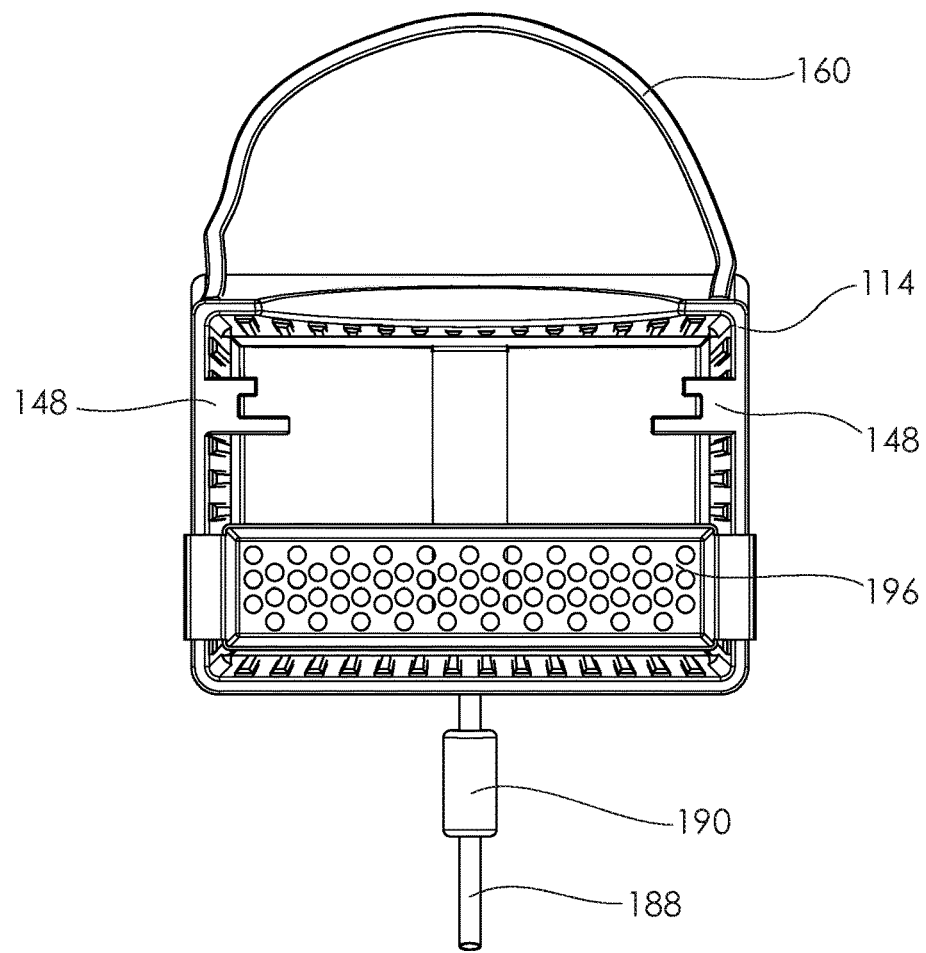
FIG. 14 is a top view illustrating the second example of the apparatus.
Figure 15:
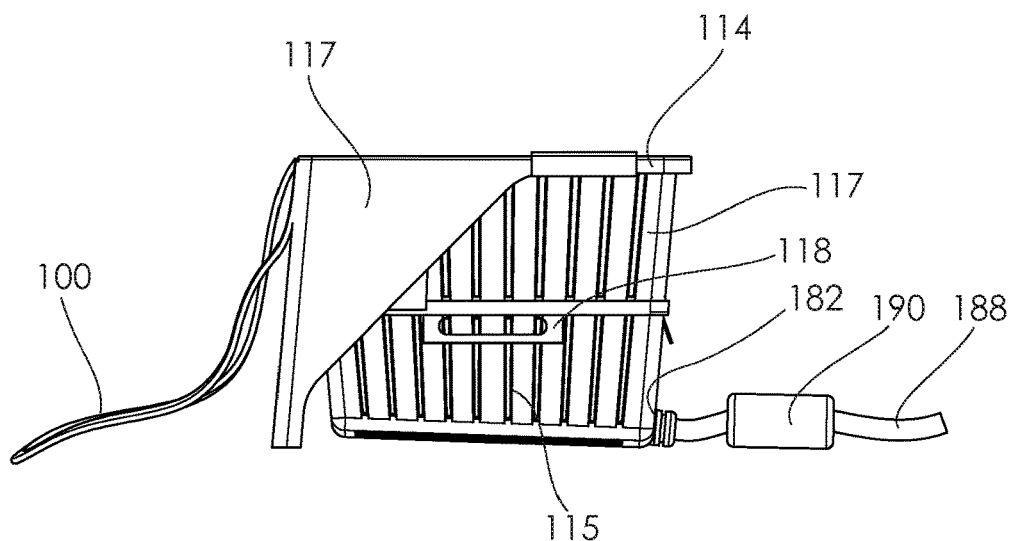
FIG. 15 is a side view illustrating the second example of the apparatus.

Accordingly, in an assembled condition, as shown in FIG. 12, the skirting flap 176 may be captured between the upper and lower tub sections 115, 117 that assist to retain the filter 118 in place during use. The material of the filter 118 may be the same as the first example and is not again repeated here. The filter 118 may include handles 80 that are accessible to remove the filter 118 when the upper and lower tub sections 115, 117 are disassembled as shown in FIG. 13. The second example may also include a removable tray 196 that seats in use atop the upper tub section 118.

The method of use may also be similar to the first example. However, of course, the filter 118 is installed within the lower tub section 115 prior to the upper tub section 117 being fitted to the lower tub section 115.

Third Example

Referring now to FIGS. 16 to 20 there is provided a third example of the apparatus 210 in which like sequences of numerals denote like parts (i.e. 10, 210 etc). Many components of this third example of apparatus 210 are similar to the above described first example and are not again repeated here. Rather, the main features and differences are highlighted.

Figure 16:
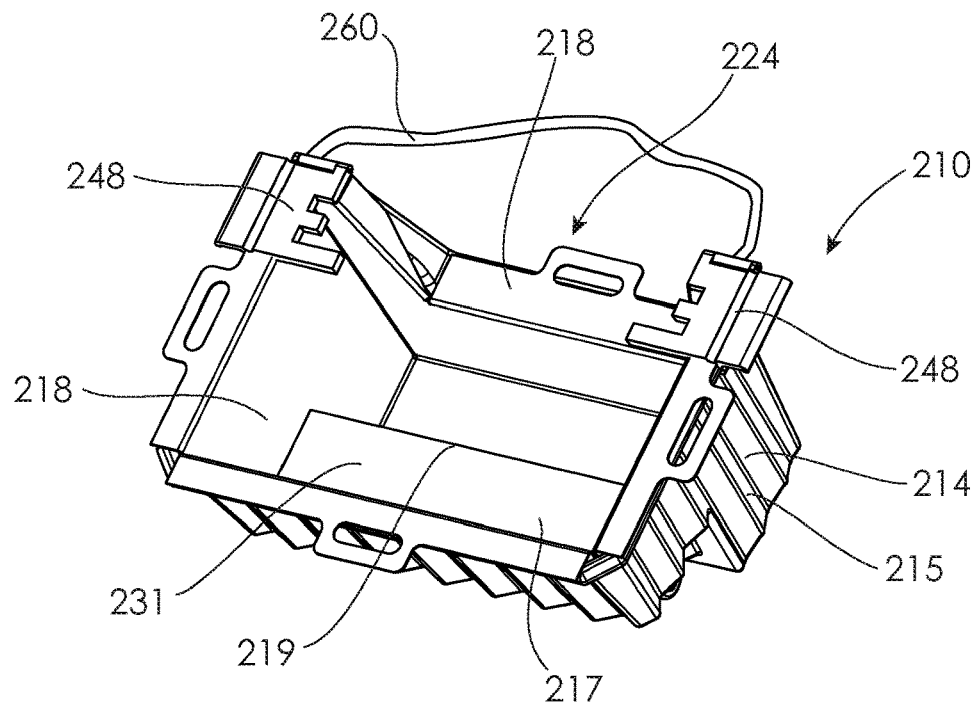
FIG. 16 is a perspective rear side view illustrating a third example of the apparatus.

Turning to the third example of the apparatus 210 in more detail, the third example of the apparatus 210 is again substantially similar to the first example. However, the tub 214 is shaped to be moveable from an initial generally horizontal position to an angled position as shown in FIGS. 16 and 17.

In more detail, in this example, the tub 214 includes a receptacle 216 having a lower portion 215 that steps to an upper portion 217 such that a step 219 is provided between the lower portion 215 and the upper portion 217. The step 219 allows the tub 14 to either rest on a base 230 of the lower portion 215 or be rolled over to the angled position in which the tub rests on corners 221, 223 of the lower portion 215 and upper portions 217, respectively.

Figure 17:
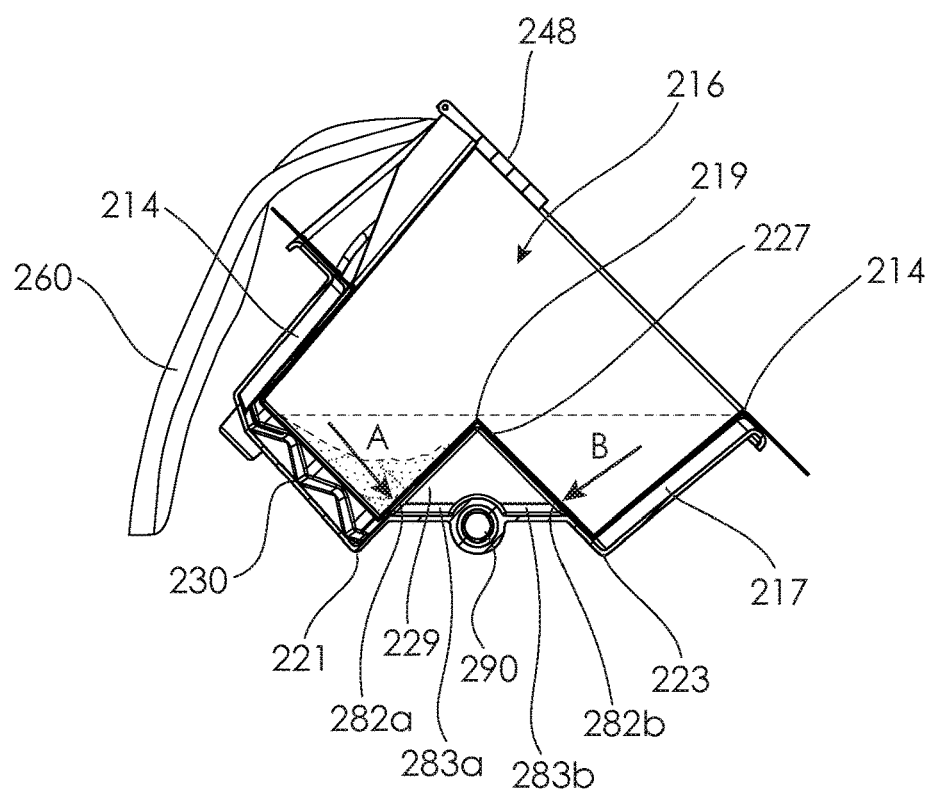
FIG. 17 is a side sectional view illustrating the third example of the apparatus.
Figure 18:
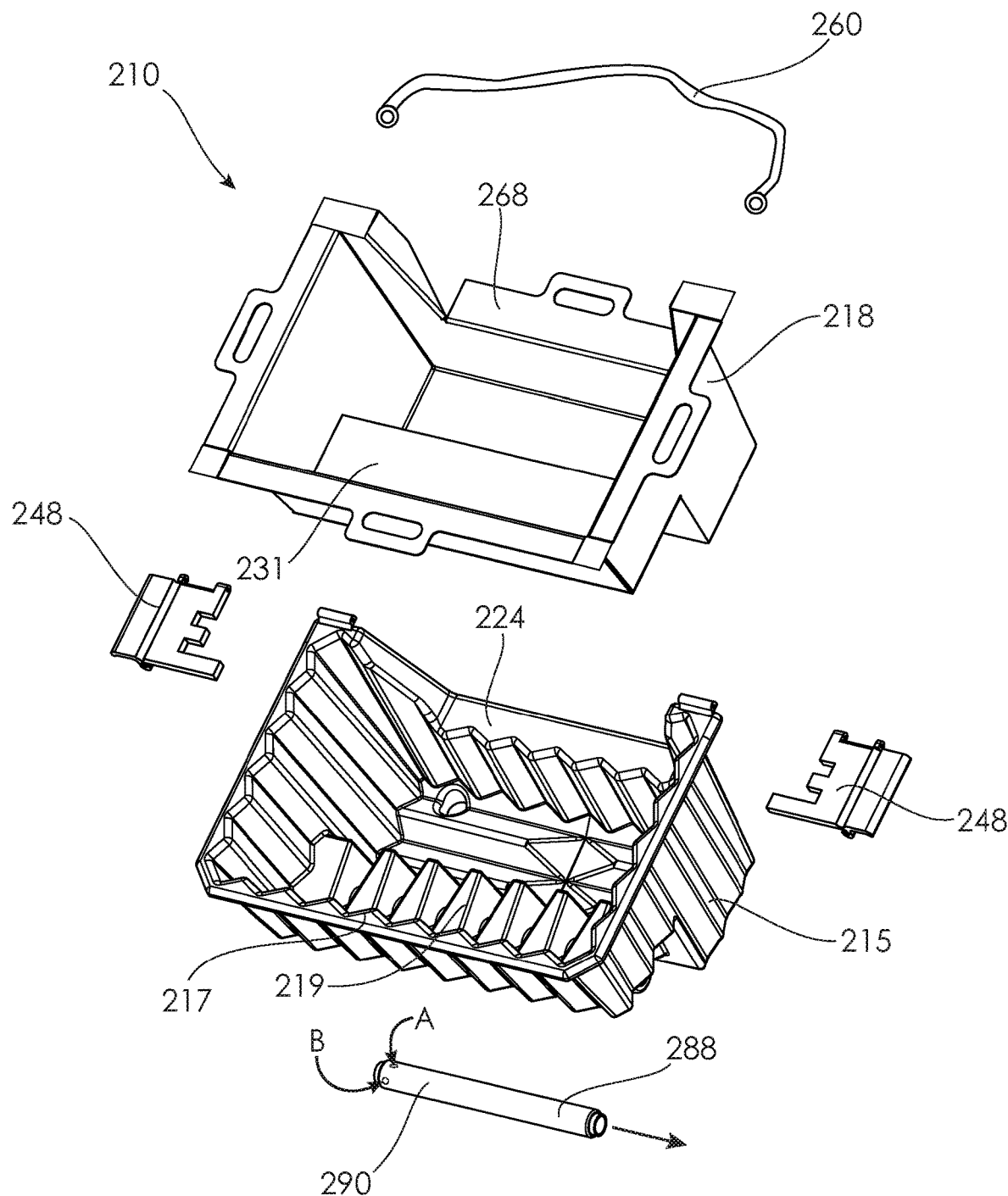
FIG. 18 is an exploded parts view illustrating the third example of the apparatus.
Figure 19:
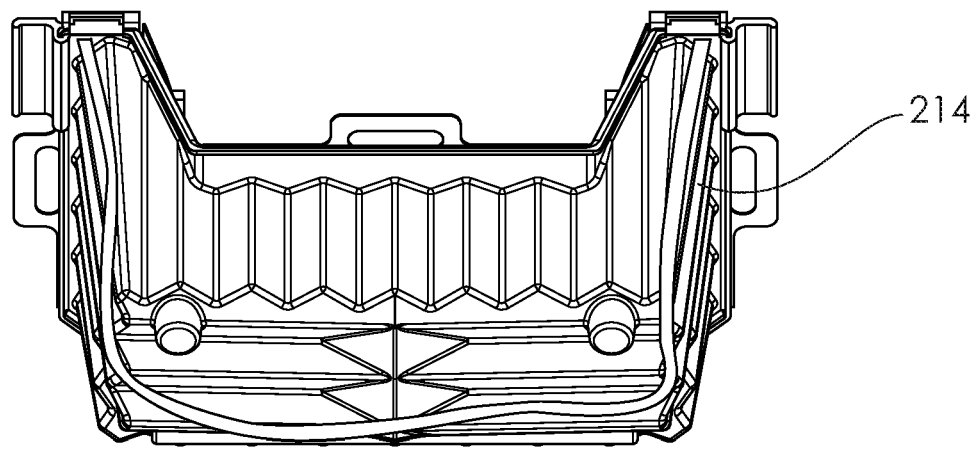
FIG. 19 is a front under side view of the third example of the apparatus.
Figure 20:
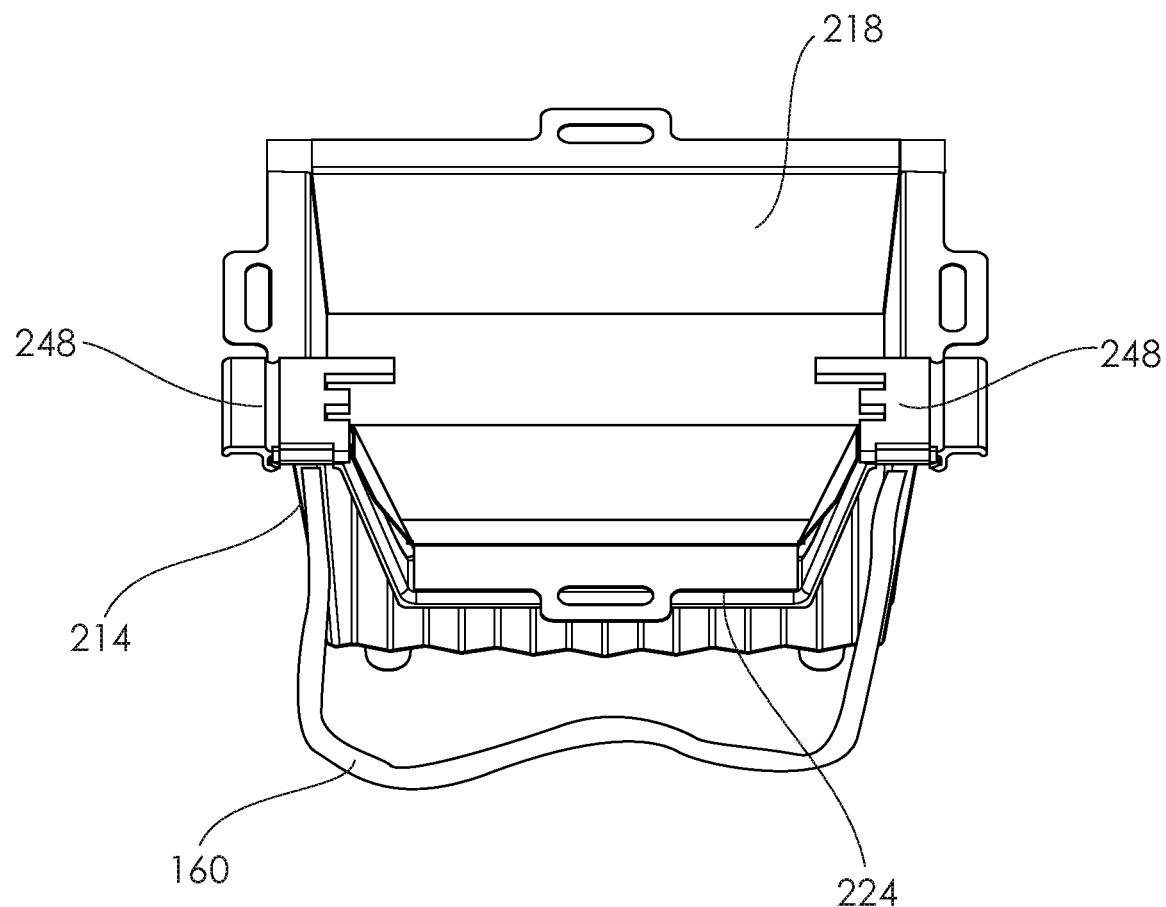
FIG. 20 is a top view illustrating the third example of the apparatus.
Figure 21:
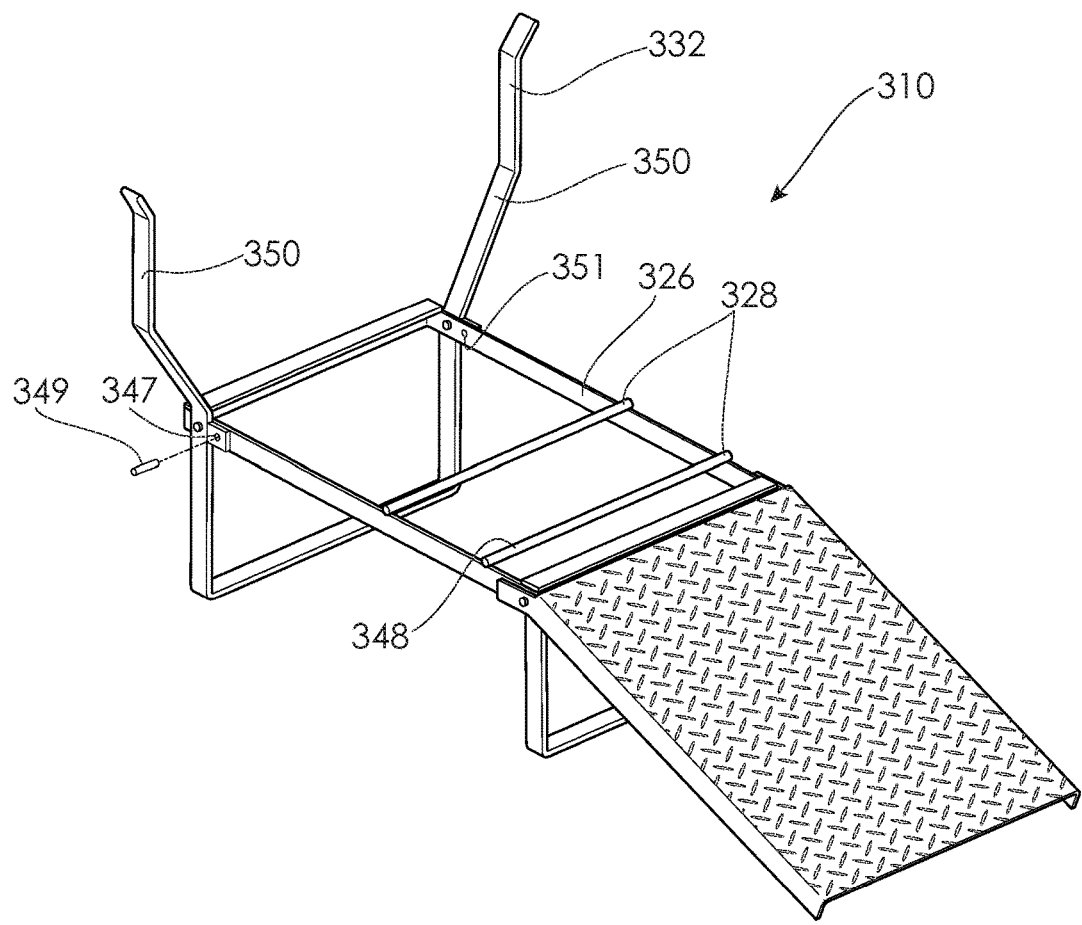
FIG. 21 is a perspective front view illustrating a stand of a fourth example of the apparatus for cleaning a wheelbarrow in a deployed condition.
Figure 22:
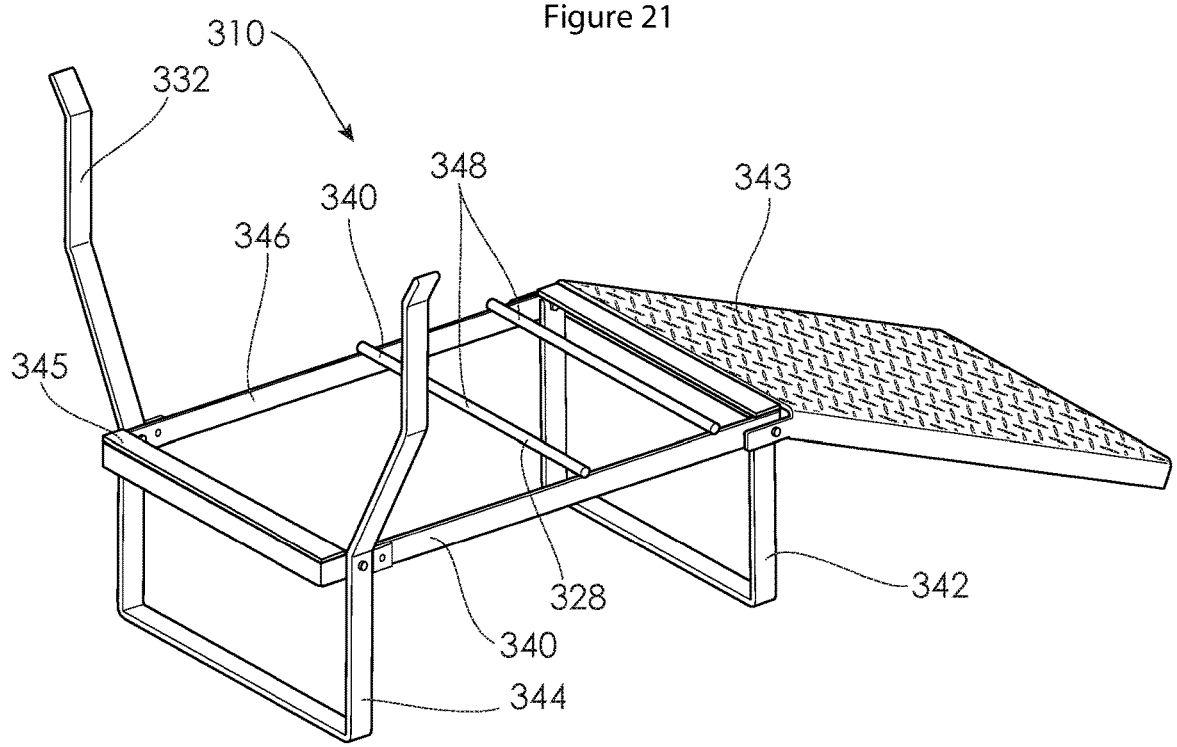
FIG. 22 is a perspective rear view illustrating the stand for cleaning the wheelbarrow in the deployed condition.
Figure 23:
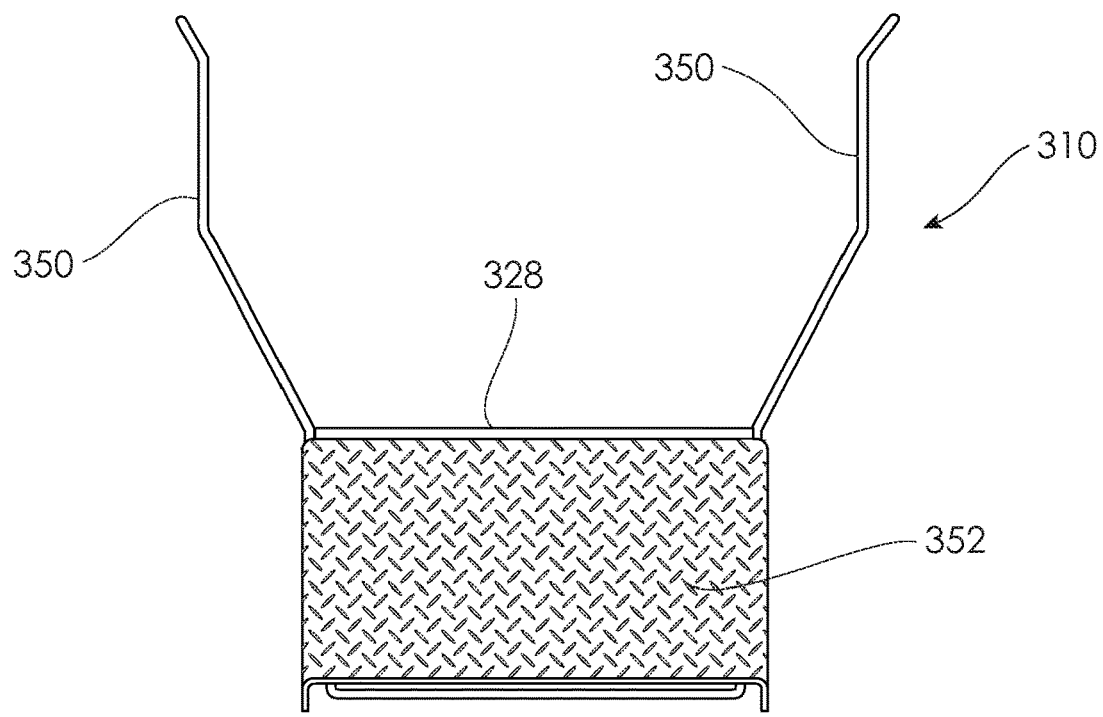
FIG. 23 is a front view illustrating the stand for cleaning a wheelbarrow in the deployed condition.
Figure 24:
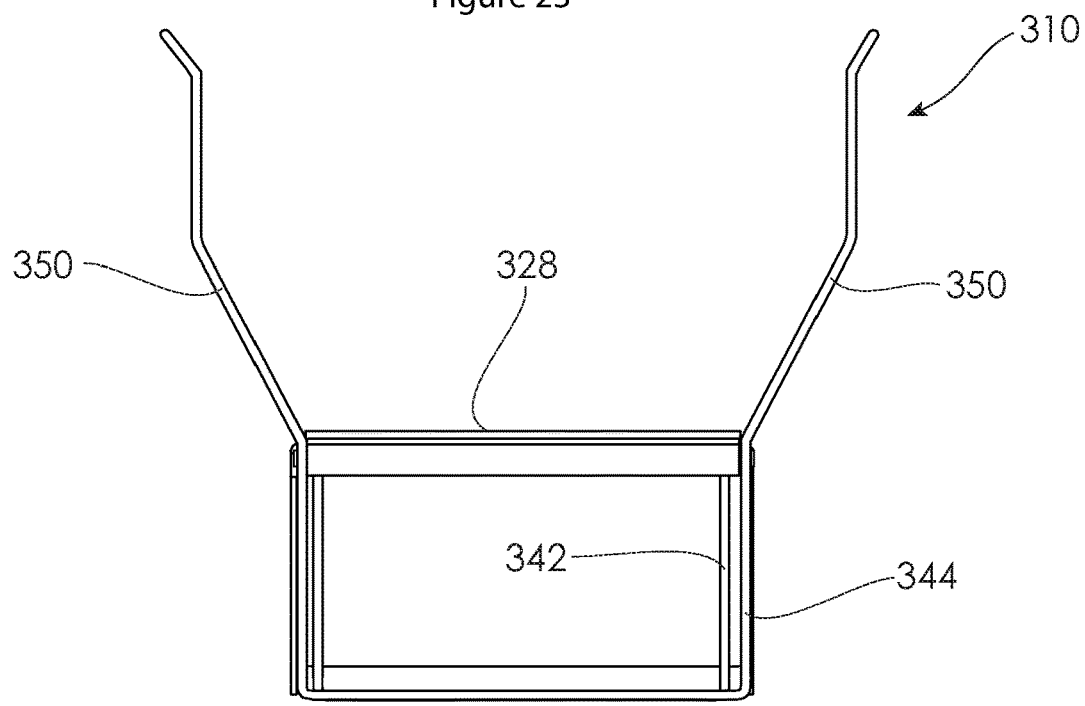
FIG. 24 is a rear view illustrating the stand for cleaning a wheelbarrow in the deployed condition.
Figure 25:
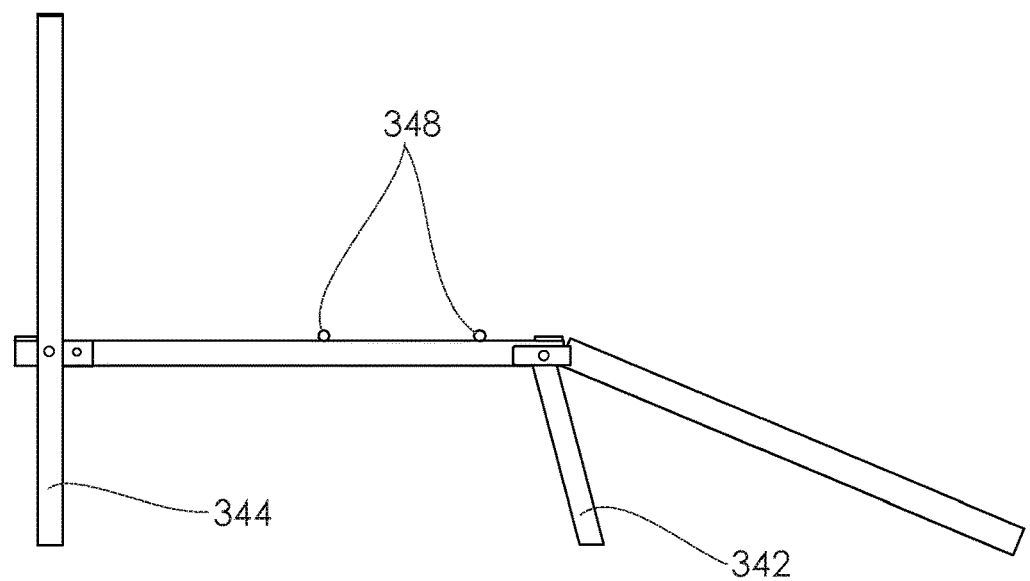
FIG. 25 is a side view illustrating the stand for cleaning the wheelbarrow in the deployed condition.
Figure 26:
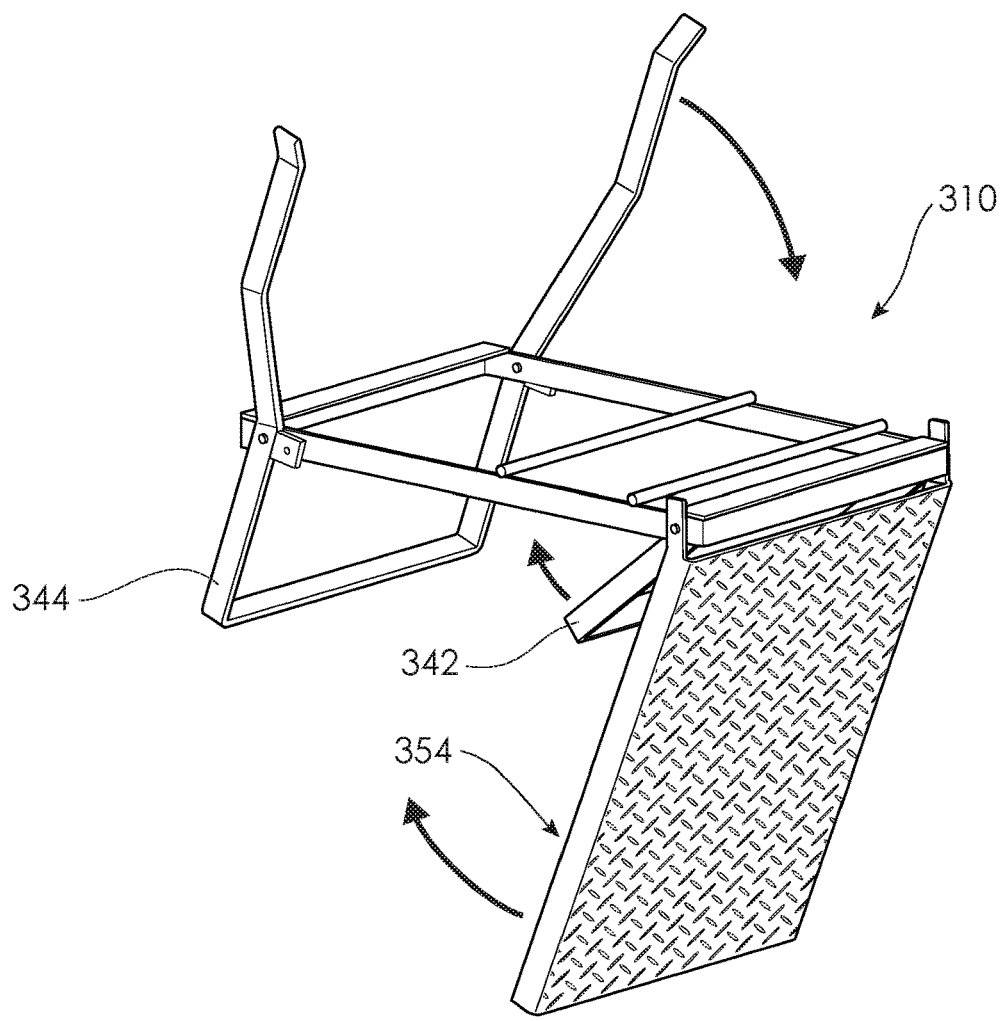
FIG. 26 is a perspective view illustrating the stand being folded toward the stowed condition.
Figure 27:
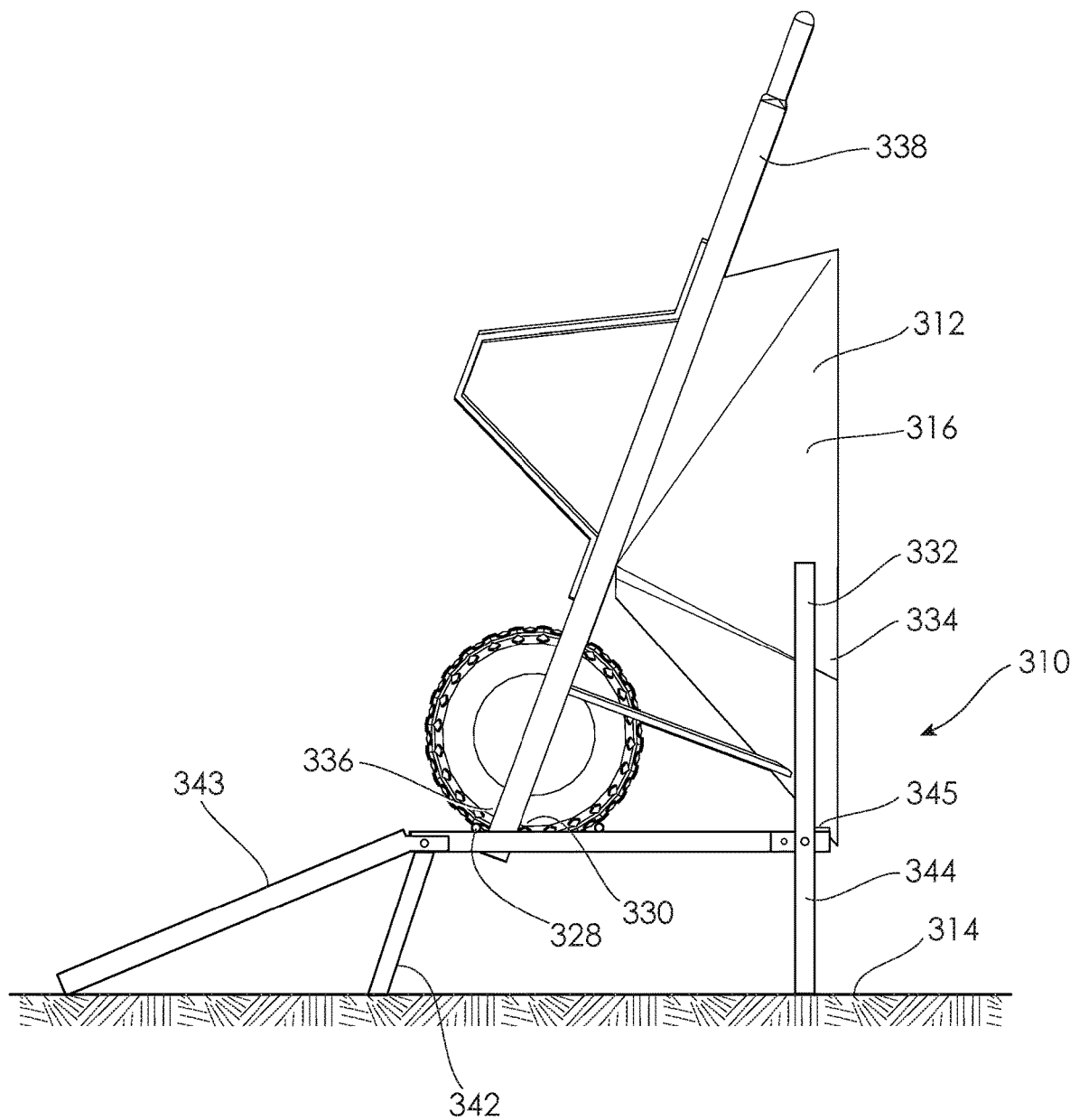
FIG. 27 is a side view illustrating the wheelbarrow in a tipped and elevated condition on the stand.

The step 219 functions to allow the tub 14 to be filled with matter and solid material within that matter to accumulate or settle via gravity more so in the lower portion 215 as shown in FIG. 17. In this tripped orientation, the step 219 provides a divider 227 between the lower and upper portions 215, 217 and matter, namely fluid with less solids is present in the upper portion 217. This assist the filter 218 to function more effectively as there is less sold material in the upper portion to block the filter 218. The step 219 also provides a nook 229 in which the hose 288 and/or fluid treatment device 290 may be positioned.

In this example, the tub 214 includes two outlets 282*a* and 282*b* in the lower and upper portions 215, 271, respectively. The two outlets 282*a* and 282*b* are elevated in the angled position to allow for drainage above any collected solid material as shown in FIG. 17.

The two outlets 282*a* and 282*b* are connected to the fluid treatment device 290 internally via conduits 283*a*, 283*b* thereby allowing fluid drainage via paths A and B at a lowest point of the lower and upper portions 215, 217 of the receptacle 216 in the angled position. The fluid treatment device 290 may then be connected to a hose 288 in a similar manner to example 1 and not again described here.

The filter 218 may be formed in a similar manner as described above in relation to example 1. However, of course, the shape of the filter 218 also includes a step 231 to correspond to the shape of the tub 214. The apparatus 210 includes a cut out 224 and tray supports 248 that are similar to that as described above in relation to example 1 and as such these parts are not again described herein.

In use, the tub 214 may initially be in an initial position in which the leading portion 36 of the wheel barrow 12 is received by the cut out 224 and is supported or located by the tray supports 48. A tether 260 may be used to retain and secure the wheel barrow 12 to the tub 214. It is noted that in this example, the tethering of the wheel barrow 12 may render the entire assembly self-supporting for ease of cleaning.

Once the wheel barrow 12 has been cleaned and the matter including solids and water is within a receptacle 216 of the tub 214. The wheel barrow 12 may be detached from the tub 214 and the tub 214 may be rotated to the angled position to allow for drainage from the outlets 282*a*, 282*b*. The tub 214 may be rocked to assist with filtration and drainage, as required. The filter 218 may be removed once soiled and replaced as need be.

Fourth Example

Figure 28:
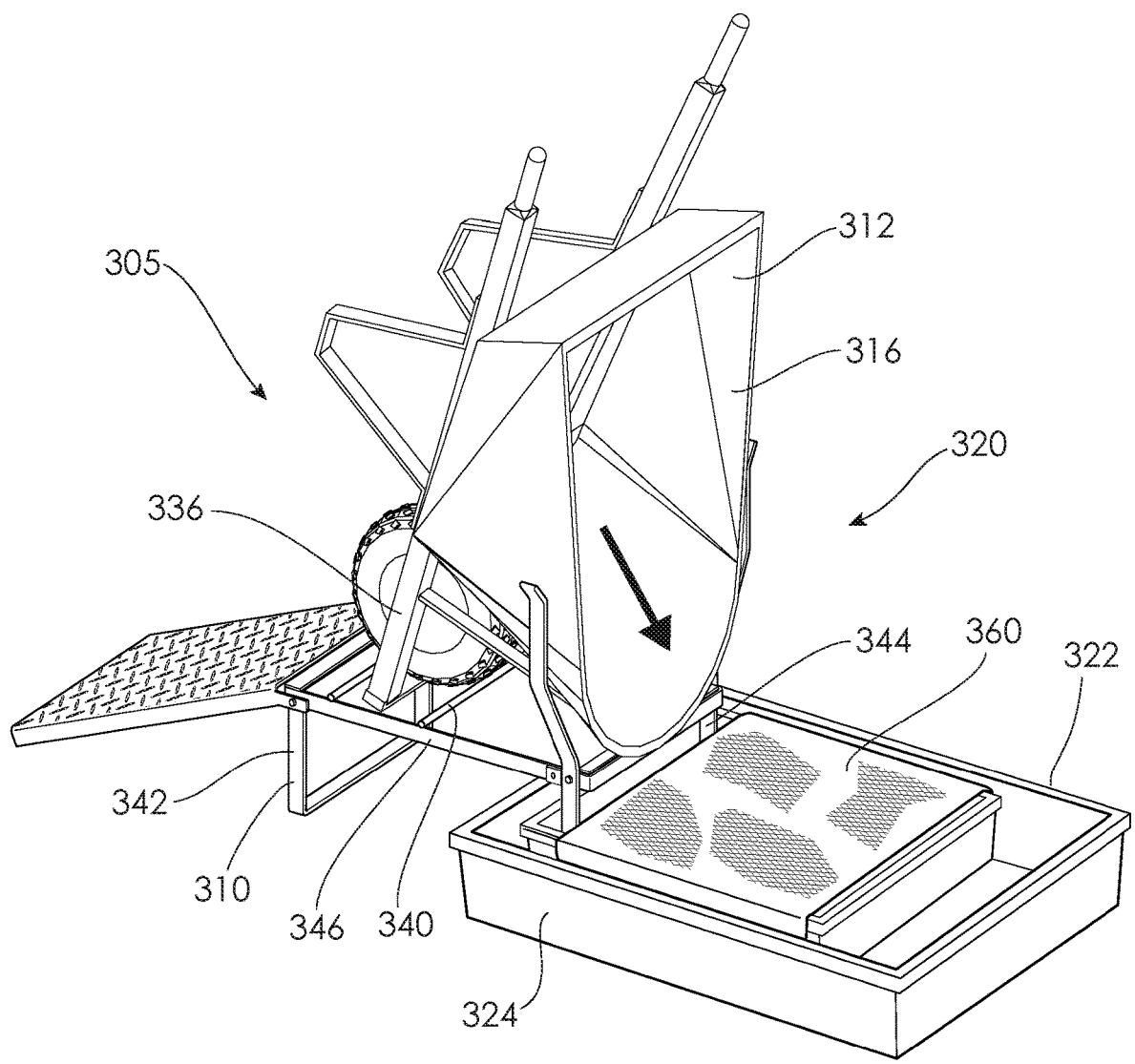
FIG. 28 is perspective view illustrating a system for cleaning a wheelbarrow including the stand and a vessel having a filter.

Referring to FIGS. 21 to 28, there is shown a fourth example of an apparatus 305 in the form of a stand 310 for cleaning a wheelbarrow 312. The stand 310 is adapted to support the wheelbarrow 312 so as to be elevated in a tipped orientation, as shown in FIG. 28, relative to supporting surface 314 such that material or fluid within a tray 316 of the wheelbarrow 312 is moveable at least partially via gravity in a direction from the tray 316 toward the supporting surface 314.

The stand 310 may be provided as part of a system 320 that further includes a receptacle 322 arranged relative to the supporting surface 314 such that in the elevated tipped orientation material or fluid from the tray 316 is directed toward and captured by the receptacle 322.

The receptacle 322 may take any form in which material or fluid within the tray 316 is moveable at least partially via gravity in a direction from the tray 314 toward the receptacle 322. The receptacle 314 may be any suitable means to collect, capture, direct or funnel fluid or material, and may be a vessel, tub, container, pipe, funnel, drain or the like. Preferably, however, the receptacle 322 is a tub or vessel 324. The arrangement of the supporting surface 314 may include more than one surface such as a stepped surface, or straight or sloped ground surface.

Turning to the stand 310 in more detail, the stand 310 includes a frame 326 having a first support 328 on which a first part 330 of the wheelbarrow 312 is supportable and a second support 332 adapted to support a second part 334 of the wheelbarrow 312 elevated above the first part 330 so as to at least temporarily retain the wheelbarrow 312 in the tipped orientation. The stand 310 includes first legs 342 toward a leading or entry end 343 of the stand 310, and second legs 344 toward opposing ends 345 of the stand 310.

The first support 328 is arranged to support a wheel end 336 of the wheelbarrow 312 and the second support 332 is arranged to support the at least one of the tray 316 and handles 338 so as to at least temporarily retain the wheelbarrow 312 in the tipped orientation.

In this example, first support 328 includes a wheel stop 340 against which the wheelbarrow may be pivoted to the tipped orientation and engaged with the second support 332. In more detail, the first support 328 is a generally horizontal section of the frame 326 having two spaced apart lengthwise frame members 346 elevated above supporting surface 14 via the first and second legs 342, 344 which are pivotally coupled to each of the two spaced apart lengthwise frame members 346.

The wheel stop 340 may be provided as a pair of cross members 348 interconnecting extending latterly of the lengthwise frame members 346. The first support 328 may take a variety for forms such as an open frame with cross members 328 as shown here or the first support 328 may be or include a platform or other means to support the wheel end 336 of the wheelbarrow 312.

The second support 332 may be provided in form of a pair of arms 350 arranged to support the tray 316 of the wheelbarrow in the tipped orientation. The pair of arms 350 may be resiliently sprung (such as being formed from spring steel or the like) to resiliently hold opposing sides of the tray 316. The arms 350 are splayed and include outward turned ends 356 to assist with fitted of the tray 316 between the arms 350.

The stand 310 includes a ramp 352 leading to and pivotally coupled to the first support 328 and arranged to allow the wheelbarrow 312 to be wheeled up the ramp 352 to the first support 328. In this example, the first and second legs 342, 344, and the ramp 352 are foldable to allow the stand 310 to be foldable between a deployed condition in which the wheelbarrow 312 is supportable in the tipped orientation and a generally flat stowed condition.

In this example, the pair of arms 350 are each contiguous with respective ones of the second legs 44 such that the pair of arms 350 and second legs 344 are simultaneously folded with one another. The ramp 352 is wider than the first leg 342 and may include a recess 354 on an underside thereof to at least partially receive the first leg 342 in the stowed condition. The second legs 344 include apertures 347 through which fasteners 349 (such as a bolt or pin) may fitted to corresponding apertures 351 of the first support 328 thereby allowing locking of the second legs 344 in the fitted deployed condition. It is noted the first legs 342 rotated past 90 degrees and abut with the first support 328 thereby being retained by the weight of the stand 310.

Turning to the system 320 in more detail as shown in FIG. 28, the system 320 is preferably arranged with the vessel 324 arranged below the tray 316 of the wheelbarrow 312 in the tipped orientation. The vessel 324 is generally fitted below two spaced apart lengthwise frame members 346 of the frame 326 with the second legs 344 in the vessel 324. The arms 350 may be positioned toward one end or intermediate the vessel 324 such that when cleaning fluid (i.e. water) is applied to the tray, the fluid material mixture within the tray 316 is moveable at least partially via gravity toward and into the vessel 324.

In some examples, the system 320 further includes a filter 360 fittable between the tray 316 and the vessel 324. The filter 360 is adapted to selectively capture solid material of the fluid material mixture thereby separating such material from the cleaning fluid. The cleaning fluid is therefore maintained relatively clean and may be reused or disposed of as per examples 1-3 above. The filter 360 may be secured across an opening of the vessel 324, or may be suspended from the frame 310. The filter 360 may be a filter material such as a geo-fabric, or paper, hemp etc as described above.

In some examples, the filter 360 may be removable or replaceable such as a cartridge or unit adapted to be fitted to the vessel 324. The use of the filter 360 allows for re-use of the contained water that has passed through the filter 360. It may be bucketed back into a cement mixer the following day or pumped with a small submersible pump to another location. In some examples, the vessel 324 may include valve and tap that allows the excess cleaned water to be drained to another location via gravity. This may simply be a bung hole and plug with hose attached 100 mm above the bottom of the vessel 324. In some examples, the height of the wheelbarrow stand 310 may be adjustable so that it can be raised to suit vessels 324 with higher sides.

Turning to a method of cleaning a wheelbarrow using the above system 320, the method generally includes the steps of: elevating the wheelbarrow 312 using the ramp 352 and supporting the wheel end 336 thereof on the first support 328. The wheel end 336 is abutted with the wheel stop 340 and the handles 338 are lifted to pivot the wheelbarrow to the tipped orientation with the tray 316 supported by the second support 332, in this example, the arms 350 that resiliently capture and support opposing sides of the tray 316. The wheelbarrow 312 is then supported in the tipped orientation with the tray 316 thereof located above the vessel 324. It is noted that the stand 310 may firstly need to be moved between the stowed and the deployed conditions.

In some examples, the filter 360 is arranged substantially such that a fluid material mixture is passed from the tray 16 through the filter 360 into the vessel 324; and applying a cleaning fluid, such as water, to the tray 316 such that the fluid material mixture within the tray 316 is moveable at least partially via gravity toward the vessel 324 with at least some solid material carried by the fluid material mixture being captured by the filter 360. The filter 360, that may be a material filter, may then be discarded along with the collected solids and the captured water may be reused.

Advantageously, there has been described examples of an apparatus, associated systems and methods of use that allows for easy, convenient, safe and environmentally friendly cleaning of tools and equipment, in particular, wheelbarrows.

The provided examples allow the wheelbarrow and tools to be cleaned whilst capturing the wastewater and any solid material such as cement. The filter is able to be removed to safely dispose of captured material and the remaining water is able to be collected for disposal or treatment.

The support arrangement allows the wheelbarrow to be held for hands free cleaning and the integrated cut out allows the wheelbarrow to be tipped without lifting the entire wheel barrow. Tools or other equipment may be supported by the cleaning tray above the tub that allows simultaneous cleaning of the wheelbarrow and tools whilst keeping waste water contained.

The filter may be pre-shaped for ease of fitting and may include handles for ease of removal and disposal of the contained captured material. The internal surfaces of the tub include surface features to assist with movement of fluid, typically water, past the filter and the fluid treatment device assist to adjust the pH of the fluid after filtration such that the fluid, in particular, waste water may be disposed of onsite in a more environmentally friendly manner.

In one example the apparatus may include a wheelbarrow stand that advantageously allows the wheelbarrow to be supported in an elevated tipped position to allow for ease of cleaning over a collection vessel. The stand is easily foldable and transportable. The stand may be provided as part of a system including the stand, the collection vessel and the filter. The arrangement of the system being such that the wheelbarrow may be cleaned generally over the collection vessel with the filter collecting the solid material thereby leaving a cleaning fluid, typically water, in the collection vessel that may be reused or disposed of safely, and the collected solid material may be discarded.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

The invention claimed is:

1. An apparatus for cleaning a wheelbarrow having a tray and retaining a fluid, the apparatus comprising a tub,
   the tub having a back wall opposite a front wall, opposing side walls, a base, and a rim,
   the front wall having a cut out therein defining two opposing side sections in the front wall on either side of the cut out, and at least a portion of each side section extends from the tub rim to the base, and each side section that extends from the tub rim to the base extends inward from the side walls toward the cut out, and the front wall includes an intermediate section below the cut out that is relatively lower than the tub rim, and spaced upward from the base, such that a leading portion of a wheelbarrow tray is movable thereover without elevating a wheel of the wheelbarrow, and wherein the opposing side sections of the front wall can engage with the tray of a wheelbarrow when the leading edge of the tray is inside the tub and the wheelbarrow is in a tipped orientation, the cut out being shaped to receive at least a portion of a wheelbarrow tray thereby providing a support arrangement,
   the tub adapted for receiving a filter that is fittable in the tub, the filter including a filter front wall having a filter front wall cut out corresponding to the cut out of the front wall of the tub, a filter back wall opposite the filter front wall, opposing filter side walls, a filter base, and a filter skirting flap adapted to engage the tub rim, and
   wherein the support arrangement is adapted to at least temporarily hold the wheelbarrow in a tipped orientation relative to the tub such that matter within a tray of the wheelbarrow is moveable at least partially via gravity into the tub.

2. The apparatus according to claim 1, wherein the cut out of the front wall of the tub is shaped to cradle the leading portion of the wheelbarrow tray in the tipped orientation thereby providing the support arrangement.

3. The apparatus according to claim 1, wherein the cut out of the front wall of the tub is shaped to engage an underside of the leading portion of the wheelbarrow tray in the tipped orientation thereby providing an underside support of the support arrangement.

4. The apparatus according to claim 1, wherein the intermediate section includes an intermediate lip extending along a top thereof.

5. The apparatus according to claim 1, wherein the intermediate section is substantially horizontal and extends relatively outwardly from the front side of the tub.

6. The apparatus according to claim 1 wherein the opposing side sections:
   are shaped to cradle the tray of the wheelbarrow in the tipped orientation, or
   are shaped such that the cut out narrows toward the intermediate section, or
   are angled inwardly toward the intermediate section, or
   include a side lip against which the tray of the wheelbarrow bears in the tipped orientation, or
   any combination of (i) to (iv) above.

7. The apparatus according to claim 1, wherein the tub includes an outlet and an inside surface of the tub is shaped to promote flow of fluid through the filter toward the outlet.

8. The apparatus according to claim 7, wherein the outlet is arranged to be fittable with a treatment device.

9. The apparatus according to claim 8, wherein the fluid treatment device is adapted to alter the pH of fluid passing therethrough.

10. The apparatus according to claim 1, wherein the apparatus further includes a reservoir adapted to collect filtered fluid from the tub.

11. The apparatus according to claim 10 including (1) a body on which the tub and wheelbarrow are locatable, and wherein the body provides a platform on which the tub and wheelbarrow are locatable, and (2) a ramp to the platform.

12. The apparatus according to claim 1, wherein at least some of an inside surface of the tub adjacent the filter is not smooth so as to promote flow of fluid through the filter.

13. The apparatus according claim 12, wherein at least some of an inside surface of the tub adjacent the filter includes one or more of corrugations, projections, ridges, apertures and recesses arranged to assist fluid through the filter.

14. The apparatus according to claim 1, wherein the apparatus comprises the tub and a filter fittable in the tub, the filter including a filter front wall having a filter front wall cut out corresponding to the cut out of the front wall of the tub, a filter back wall opposite the filter front wall, opposing filter side walls, a filter base, and a filter skirting flap adapted to engage the tub rim.

15. The apparatus according to claim 14, wherein the filter front wall cut out is bounded by two opposing filter side sections formed by the filter front wall of on either side of the filter front wall cut out, and the skirting flap includes an intermediate flap on a lower side of the cut out so that a portion of the tray of the wheelbarrow is movable thereover without elevating a wheel of the wheelbarrow,
   wherein the intermediate flap is adapted to sit atop and extend beyond the cut out in the front wall of the tub so that in use, matter is substantially prevented from falling between the filter front wall and the front wall of the tub.

16. The apparatus according to claim 14, wherein the filter back wall and the opposing filter side wall are attached to the filter base and extend from the filter base to the tub rim, the filter front wall is attached to the filter base and at least a portion of the two opposing filter side sections formed by the front wall of the filter on either side of the cut out extend from the base to the tub rim, and an area of the front wall below the cut out of the front wall extends from the base to the intermediate flap.

17. A filter to filter solid material from a fluid washed from a wheelbarrow, the filter being a structure made of paper, cellulose, hemp, banana fibre, synthetic textiles, recycled textiles, geo-fabric, or a combination thereof, the filter comprising:
a filter front wall, a filter back wall opposite the filter front wall, opposing filter side walls, a filter base, and a filter skirting flap that are each pre-shaped to correspond to a tub front wall, a tub back wall, opposing tub side walls, a tub base, and a tub rim respectively when the filter is placed inside a tub;
wherein the filter front wall defines a filter front wall cut out that is shaped to receive at least a portion of a tray of the wheelbarrow, the filter front wall cut out bounded by two opposing filter side sections formed by the filter front wall on either side of the filter front wall cut out and the two filter side sections of the filter front wall extend inward from the filter side walls toward the filter front wall cut out,
and the filter skirting flap includes an intermediate flap on a lower side of the filter front wall cut out so that a portion of the tray of the wheelbarrow is movable thereover without elevating a wheel of the wheelbarrow; and
wherein the intermediate flap is adapted to sit atop and extend beyond the cut out in the front wall of the tub so that in use, matter is substantially prevented from falling between the filter front wall and the front wall of the tub.

18. The filter according to claim 17, wherein the skirting flap of the filter is arranged to locate atop of the tub rim when the filter is placed inside the tub.

19. The filter of claim 17, wherein the filter back wall and opposing filter side wall are attached to the filter base and extend from the filter base to the tub rim, the filter front wall is attached to the filter base and at least a portion of the two opposing filter side sections formed by the filter front wall on either side of the filter front wall cut out extend from the filter base to the tub rim, and an area of the filter front wall below the filter front wall cut out extends from the filter base to the intermediate flap.

20. A method for cleaning a wheelbarrow with a fluid, the method including:
locating a tub on a ground surface, the tub having a back wall opposite the front wall, opposing side walls, a base, and rim, the front wall having a cut out therein defining two opposing side sections in the front wall on either side of the cut out, and at least a portion of each side section of the front wall extends from the tub rim to the base, and each side section that extends from the tub rim to the base extends inward from the side walls toward the cut out, and the front wall includes an intermediate section below the cut out that is relatively lower than the tub rim, and spaced upward from the base, such that a leading portion of a wheelbarrow tray is movable thereover without elevating a wheel of the wheelbarrow, and wherein the opposing side sections of the front wall can engage with the tray of a wheelbarrow when the leading edge of the tray is inside the tub and the wheelbarrow is in a tipped orientation, the cut out being shaped to receive at least a portion of a wheelbarrow tray thereby providing a support arrangement, the tub adapted for receiving a filter that is fittable in the tub,
wherein the support arrangement is adapted to at least temporarily hold the wheelbarrow in a tipped orientation relative to the tub such that matter within a tray of the wheelbarrow is moveable at least partially via gravity into the tub;
fitting a filter to the tub, the filter being a structure made of paper, cellulose, hemp, banana fibre, synthetic textiles, recycled textiles, geo-fabric, or a combination thereof, the filter comprising a filter front wall, a filter back wall opposite the filter front wall, opposing filter side walls, a filter base, and a filter skirting flap that are each pre-shaped to correspond to the tub front wall, the tub back wall, the opposing tub side walls, the tub base, and the tub rim respectively when the filter is placed inside the tub, the filter front wall having a filter front wall cut out corresponding to the cut out of the front wall of the tub and the filter front wall cut out is bounded by two opposing filter side sections formed by the filter front wall on either side of the filter front wall cut out and the two filter side sections of the filter front wall extend inward from the filter side walls toward the filter front wall cut out;
moving a wheelbarrow toward the tub in an initial orientation with at least a leading portion of the wheelbarrow received by the cut out of the tub;
lifting the wheelbarrow to a tipped orientation relative to the tub such that matter within a tray of the wheelbarrow is moveable at least partially via gravity into the tub;
holding the wheelbarrow in the tipped orientation with the support arrangement;
applying a cleaning fluid to the tray of the wheelbarrow;
capturing solid material within the filter; and
disposing of the filter and captured solid material.

* * * * *